US012602898B2

(12) United States Patent
Duckworth et al.

(10) Patent No.: US 12,602,898 B2
(45) Date of Patent: Apr. 14, 2026

(54) NEURAL SEMANTIC FIELDS FOR GENERALIZABLE SEMANTIC SEGMENTATION OF 3D SCENES

(71) Applicant: Google LLC, Mountain View, CA (US)

(72) Inventors: Daniel Christopher Duckworth, Berlin (DE); Suhani Deepak-Ranu Vora, San Mateo, CA (US); Noha Radwan, Zurich (CH); Klaus Greff, Berlin (DE); Henning Meyer, Berlin (DE); Kyle Adam Genova, San Mateo, CA (US); Seyed Mohammad Mehdi Sajjadi, Berlin (DE); Etienne François Régis Pot, Berlin (DE); Andrea Tagliasacchi, Victoria (CA)

(73) Assignee: GOOGLE LLC, Mountain View, CA (US)

( * ) Notice: Subject to any disclaimer, the term of this patent is extended or adjusted under 35 U.S.C. 154(b) by 477 days.

(21) Appl. No.: 18/012,264

(22) PCT Filed: Oct. 10, 2022

(86) PCT No.: PCT/US2022/046164
§ 371 (c)(1),
(2) Date: Dec. 22, 2022

(87) PCT Pub. No.: WO2023/091249
PCT Pub. Date: May 25, 2023

(65) Prior Publication Data

US 2024/0119697 A1 Apr. 11, 2024

Related U.S. Application Data

(60) Provisional application No. 63/279,864, filed on Nov. 16, 2021.

(51) Int. Cl.
| | |
|---|---|
| *G06V 10/26* | (2022.01) |
| *G06T 7/143* | (2017.01) |
| *G06T 15/08* | (2011.01) |

(52) U.S. Cl.
CPC .............. *G06V 10/26* (2022.01); *G06T 7/143* (2017.01); *G06T 15/08* (2013.01); *G06T 2207/20076* (2013.01); *G06T 2207/20081* (2013.01)

(58) Field of Classification Search
CPC ...... G06V 10/26; G06V 10/778; G06V 10/82; G06V 20/647; G06T 7/143;
(Continued)

(56) References Cited

U.S. PATENT DOCUMENTS

| | | | |
|---|---|---|---|
| 6,522,324 B1 * | 2/2003 | Bosma | .................... G06T 17/00 |
| | | | 345/419 |
| 2021/0103776 A1 | 4/2021 | Jiang et al. | |

FOREIGN PATENT DOCUMENTS

WO WO-2022076658 A1 * 4/2022 .......... B60W 60/001

OTHER PUBLICATIONS

In-Place Scene Labelling and Understanding with Implicit Scene Representation (Year: 2021).*
(Continued)

*Primary Examiner* — Ming Y Hon
*Assistant Examiner* — Amanda H Pearson
(74) *Attorney, Agent, or Firm* — DORITY & MANNING P.A.

(57) ABSTRACT

Example embodiments of the present disclosure provide an example computer-implemented method for constructing a three-dimensional semantic segmentation of a scene from two-dimensional inputs. The example method includes obtaining, by a computing system comprising one or more processors, an image set comprising one or more views of a
(Continued)

subject scene. The example method includes generating, by the computing system and based at least in part on the image set, a scene representation describing the subject scene in three dimensions. The example method includes generating, by the computing system and using a machine-learned semantic segmentation model framework, a multidimensional field of probability distributions over semantic categories, the multidimensional field defined over the three dimensions of the subject scene. The example method includes outputting, by the computing system, classification data for at least one location in the subject scene.

20 Claims, 12 Drawing Sheets

(58) Field of Classification Search
CPC . G06T 2207/20076; G06T 7/194; G06T 7/11;
G06T 15/08; G06T 2207/20081; G06T
2207/10016; G06T 2207/20084; G06T
17/00
See application file for complete search history.

(56) References Cited

OTHER PUBLICATIONS

Alwassel et al., "Self-Supervised Learning by Cross-Modal Audio-Video Clustering", 34th International Conference on Neural Information Processing Systems, Vancouver, British Columbia, Canada, Article No. 818, Dec. 6-12, 2020, pp. 9758-9770.
Armeni et al., "3D Scene Graph: A Structure for Unified Semantics, 3D Space, and Camera", arXiv:1910.02527v1, Oct. 6, 2019, 11 pages.
Aytar et al., "SoundNet: Learning Sound Representations from Unlabeled Video", arXiv:1610.09001v1, Oct. 27, 2016, 9 pages.
Badrinarayanan et al., "SegNet: A Deep Convolutional Encoder-Decoder Architecture for Image Segmentation", arXiv:1511,00561v3, Oct. 10, 2016, 14 pages.
Barron et al., "Mip-NeRF: A Multiscale Representation for Anti-Aliasing Neural Radiance Fields", arXiv:2103.13415v3, Aug. 14, 2021, 19 pages.
Billard et al., "Trends and Challenges in Robot Manipulation" Science, vol. 364, Issue 6446, Jun. 21, 2019, 9 pages.
Bonin-Font et al., "Visual Navigation for Mobile Robots: A Survey", Journal of Intelligent and Robotic Systems, vol. 53, 2008, pp. 263-296.
Boss et al., "NeRD: Neural Reflectance Decomposition from Image Collections", arXiv:2012.03918v4, Aug. 26, 2021, 15 pages.
Caesar et al., "nuScenes: A Multimodal Dataset for Autonomous Driving" arXiv:1903.11027v5, May 5, 2020, 16 pages.
Chabra et al., "Deep Local Shapes: Learning Local SDF Priors for Detailed 3D Reconstruction", arXiv:2003.10983v3, Aug. 21, 2020, 26 pages.
Chang et al., "Matterport3D: Learning from RGB-D Data in Indoor Environments" arXiv:1709.06158v1, Sep. 18, 2017, 25 pages.
Chang et al., "ShapeNet: An Information-Rich 3D Model Repository", arXiv:1512.03012, Dec. 9, 2015, 11 pages.
Che et al., "Object Recognition, Segmentation, and Classification of Mobile Laser Scanning Point Clouds: A State of the Art Review", Sensors 19, No. 4, 42 pages.
Chen et al., "BSP-Net: Generating Compact Meshes via Binary Space Partitioning", arXiv:1911.06971v6, Dec. 7, 2020, 10 pages.
Chen et al., "DeepLab: Semantic Image Segmentation with Deep Convolutional Nets, Atrous Convolution, and Fully Connected CRFs", arXiv:1606.00915v2, May 12, 2017, 14 pages.
Chen et al., "Learning Implicit Fields for Generative Shape Modeling", arXiv:1812.02822v5, Sep. 16, 2019, 10 pages.

Chen et al., "MVSNeRF: Fast Generalizable Radiance Field Reconstruction from Multi-View Stereo", arXiv:2103.15595v2, Aug. 24, 2021, 13 pages.
Chen et al., "Rethinking Atrous Convolution for Semantic Image Segmentation", arXiv:1706.05587v3, Dec. 5, 2017, 14 pages.
Cheng et al., "(AF)2-S3Net: Attentive Feature Fusion with Adaptive Feature Selection for Sparse Semantic Segmentation Network", arXiv:2102.04530v1, Feb. 8, 2021, 10 pages.
Chibane et al., "Implicit Functions in Feature Space for 3D Shape Reconstruction and Completion", arXiv:2003.01456v2, Apr. 15, 2020, 12 pages.
Chollet, "Xception: Deep Learning with Depthwise Separable Convolutions", arXiv:1610.02357v3, Apr. 4, 2017, 8 pages.
Choy et al., "4D Spatio-Temporal ConvNets: Minkowski Convolutional Neural Networks", arXiv:1904.08755v4, Jun. 13, 2019, 21 pages.
Choy et al., "Fully Convolutional Geometric Features", 2019 Institute of Electrical and Electronics Engineers, International Conference on Computer Vision, Seoul, Korea, Oct. 27-Nov. 2, 2019, pp. 8958-8965.
Cicek et al., "3D U-Net: Learning Dense Volumetric Segmentation from Sparse Annotation", arXiv:1606.06650v1, Jun. 21, 2016, 8 pages.
Cole et al., "Differentiable Surface Rendering via Non-Differentiable Sampling", arXiv:2108.04886v1, Aug. 10, 2021, 10 pages.
Cortinhal et al., "SalsaNext: Fast, Uncertainty-aware Semantic Segmentation of LiDAR Point Clouds for Autonomous Driving", arXiv:2003.03653v3, Jul. 9, 2020, 8 pages.
Dai et al., "3DMV: Joint 3D-Multi-View Prediction for 3D Semantic Scene Segmentation", arXiv:1803.10409v1, Mar. 28, 2018, 20 pages.
Dai et al., "ScanComplete: Large-Scale Scene Completion and Semantic Segmentation for 3D Scans", arXiv:1712.10215v2, Mar. 28, 2018, 15 pages.
Dai et al., "ScanNet: Richly-annotated 3D Reconstructions of Indoor Scenes", arXiv:1702.04405v2, Apr. 11, 2017, 22 pages.
Deng et al., "CvxNet: Learnable Convex Decomposition", arXiv:1909.05736v4, Apr. 12, 2020, 14 pages.
DeVries, "Unconstrained Scene Generation with Locally Conditioned Radiance Fields", arXiv:2104.00670v1, Apr. 1, 2021, 17 pages.
Douillard et al., "On the Segmentation of 3D Lidar Point Clouds", 2011 Institute of Electrical and Electronics Engineers, International Conference on Robotics and Automation, Shanghai, China, May 9-13, 2011, 8 pages.
Ephrat et al., "Looking to listen at the cocktail party: A Speaker-Independent Audio-Visual Model for Speech Separation", arXiv:1804.03619v2, Aug. 9, 2018, 11 pages.
Gan et al., "Self-Supervised Moving Vehicle Tracking with Stereo Sound", arXiv:1910.11760v1, Oct. 25, 2019, 10 pages.
Garbin et al., "FastNeRF: High-Fidelity Neural Rendering at 200FPS", arXiv:2103.10380v2, Apr. 15, 2021, 20 pages.
Genova et al., "Learning 3D Semantic Segmentation with only 2D Image Supervision", arXiv:2110.11325v1, Oct. 21, 2021, 20 pages.
Genova et al., "Learning Shape Templates with Structured Implicit Functions", arXiv:1904.06447v1, Apr. 12, 2019, 12 pages.
Girdhar et al., "Distinit: Learning Video Representations Without a Single Labeled Video", arXiv:1901.09244v2, Aug. 20, 2019, 10 pages.
Graham et al., "3D Semantic Segmentation with Submanifold Sparse Convolutional Networks", arXiv:1711.10275v1, Nov. 28, 2017, 11 pages.
Graham et al., "Submanifold Sparse Convolutional Networks", arXiv:1706.01307v1, Jun. 5, 2017, 10 pages.
Groueix et al., "AtlasNet: A Papier-Mâché Approach to Learning 3D Surface Generation", arXiv:1802.05384v3, Jul. 20, 2018, 16 pages.
Guo et al., "Deep Learning for 3D Point Clouds: A Survey", arXiv:1912.12033v2, Jun. 23, 2020, 27 pages.
Gupta et al., "Cross Modal Distillation for Supervision Transfer", arXiv:1507.00448v2, Nov. 25, 2015, 14 pages.
Hafiz et al., "A Survey on Instance Segmentation: State of the Art", arXiv:2007.00047v1, Jun. 28, 2020, 28 pages.

(56) References Cited

OTHER PUBLICATIONS

Han et al., "OccuSeg: Occupancy-aware 3D Instance Segmentation", arXiv:2003.06537v3, Apr. 28, 2020, 12 pages.
Hanocka et al., "MeshCNN: A Network with an Edge", arXiv:1809. 05910v2, Feb. 13, 2019, 12 pages.
He et al., "Deep Learning based 3D Segmentation: A Survey", arXiv:2103.05423v2, Mar. 10, 2021, 36 pages.
Hedman et al., "Baking Neural Radiance Fields for Real-Time View Synthesis", arXiv:2103.14645v1, Mar. 26, 2021, 15 pages.
Henzler et al., "Unsupervised Learning of 3D Object Categories from Videos in the Wild", arXiv:2103.16552v1, Mar. 30, 2021, 14 pages.
Hermans et al., "Dense 3D Semantic Mapping of Indoor Scenes from RGB-D Images", 2014 Institute of Electrical and Electronics Engineers International Conference on Robotics & Automation, Hong Kong, China, May 31-Jun. 7, 2014, 8 pages.
Hu et al., "JSENet: Joint Semantic Segmentation and Edge Detection Network for 3D Point Clouds", arXiv:2007.06888v1, Jul. 14, 2020, 23 pages.
Huang et al., "An LSTM Approach to Temporal 3D Object Detection in Lidar Point Clouds", arXiv:2007.12392v1, Jul. 24, 2020, 18 pages.
Huang et al., "Texturenet: Consistent Local Parametrizations for Learning from High-Resolution Signals on Meshes", arXiv:1812. 00020v2, Mar. 28, 2019, 17 pages.
International Search Report and Written Opinion for PCT/US2022/ 046164, mailed on Feb. 2, 2023, 21 pages.
Izadi et al., "Kinectfusion: Real-Time 3D Reconstruction and Interaction Using a Moving Depth Camera", 24th Annual Association for Computing Machinery Symposium on User Interface Software and Technology, Oct. 16-19, 2011, Santa Barbara, California, United States. 10 pages.
Jain et al., "Putting NeRF on a Diet: Semantically Consistent Few-Shot View Synthesis", arXiv:2104.00677v1, Apr. 1, 2021, 15 pages.
Jang et al., "CodeNeRF: Disentangled Neural Radiance Fields for Object Categories", arXiv:2109.01750v1, Sep. 3, 2021, 10 pages.
Jaritz et al., "Multi-view PointNet for 3D Scene Understanding", arXiv:1909.13603v1, Sep. 30, 2019, 10 pages.
Jeong, "Self-Calibrating Neural Radiance Fields", arXiv:2108. 13826v2, Sep. 2, 2021, 15 pages.
Jin et al., "3D Reconstruction Using Deep Learning: A Survey", Communications in Information and Systems, vol. 20, No. 4, Article 1, Dec. 2, 2020, pp. 389-413.
Jing et al., "Self-supervised Modal and View Invariant Feature Learning", arXiv:2005.14169v1, May 28, 2020, 11 pages.
Johnson et al., "CLEVR: A Diagnostic Dataset for Compositional Language and Elementary Visual Reasoning", arXiv:1612.06890v1, Dec. 20, 2016, 17 pages.
Kingma et al., "Adam: A Method for Stochastic Optimization", arXiv:1412.6980v9, Jan. 30, 2017, 15 pages.
Klaus et al., "Kubric", https: //github.com/google-research/kubric, 2021, retrieved on Feb. 23, 2023, 5 pages.
Koepke et al., "Sight to Sound: An End-to-End Approach for Visual Piano Transcription", ICASSP 2020-2020 Institute of Electrical and Electronics Engineers International Conference on Acoustics, Speech and Signal Processing, Barcelona, Spain, May 4-8, 2020, pp. 1838-1842.
Kohli et al., "Semantic Implicit Neural Scene Representations with Semi-Supervised Training", arXiv:2003.12673v2, Jan. 17, 2021, 15 pages.
Korbar et al., "Cooperative Learning of Audio and Video Models from Self-Supervised Synchronization", arXiv:1807.00230v2, Jun. 30, 2018, 14 pages.
Kosiorek et al., "NeRF-VAE: A Geometry Aware 3D Scene Generative Model", arXiv:2104.00587v1, Apr. 1, 2021, 17 pages.
Kowdle et al., "The Need 4 Speed in Real-Time Dense Visual Tracking", Association for Computing Machinery Transactions on Graphics, vol. 37, No. 6, Article 220, Nov. 2018.

Krizhevsky et al., "ImageNet Classification with Deep Convolutional Neural Networks", Communications of the Association for Computing Machinery, vol. 60, Issue 6, Jun. 2017, pages pp. 84-90.
Kundu et al., "Virtual Multi-view Fusion for 3D Semantic Segmentation", arXiv:2007.13138v1, Jul. 26, 2020, 20 pages.
Lai et al., "Unsupervised Feature Learning for 3D Scene Labeling", 2014 Institute of Electrical and Electronics Engineers International Conference on Robotics & Automation (ICRA), May 31-Jun. 7, 2014, Hong Kong, China, 8 pages.
Lateef et al., "Survey on Semantic Segmentation Using Deep Learning Techniques", Neurocomputing, vol. 338, Apr. 21, 2019, pp. 321-348.
Lawin et al., "Deep Projective 3D Semantic Segmentation", arXiv:1705. 03428v1, May 9, 2017, 12 pages.
Lin et al., "BARF: Bundle-Adjusting Neural Radiance Fields", arXiv:2104.06405v2, Apr. 13, 2021, 15 pages.
Lin et al., "Microsoft COCO: Common Objects in Context", arXiv:1405. 0312v3, Feb. 21, 2015, 15 pages.
Lindell et al., "AutoInt: Automatic Integration for Fast Neural Volume Rendering", arXiv:2012.01714v2, May 23, 2021, 19 pages.
Liu et al., "Deep Learning for Generic Object Detection: A Survey", arXiv:1809.02165v4, Aug. 22, 2019, 35 pages.
Liu et al., "Deep Learning on Point Clouds and Its Application: A Survey.", Sensors 2019, vol. 19, Sep. 26, 2019, 22 pages.
Liu et al., "Neural Sparse Voxel Fields", arXiv:2007.11571v2, Jan. 6, 2021, 22 pages.
Long et al., "Fully Convolutional Networks for Semantic Segmentation", arXiv:1411.4038v2, Mar. 8, 2015, 10 pages.
Ma et al., "Multi-View Deep Learning for Consistent Semantic Mapping with RGB-D Cameras", arXiv:1703.08866v2, Dec. 4, 2017, 8 pages.
Martin-Brualla et al., "NeRF in the Wild: Neural Radiance Fields for Unconstrained Photo Collections", arXiv:2008.02268v3, Jan. 6, 2021, 15 pages.
Mascaro et al., "Diffuser: Multi-View 2D-to-3D Label Diffusion for Semantic Scene Segmentation", 2021 Institute of Electrical and Electronics Engineers International Conference on Robotics and Automation (ICRA 2021), Xi'an, China, May 31-Jun. 4, 2021, 7 pages.
Masci et al., "Geodesic Convolutional Neural Networks on Riemannian Manifolds", arXiv:1501.06297v3, Jun. 8, 2018, 9 pages.
Max, "Optical Models for Direct Volume Rendering", Institute of Electrical and Electronics Engineers Transactions on Visualization and Computer Graphics, vol. 1, No. 2, Jun. 1995, pp. 99-108.
McCormac et al., "SemanticFusion: Dense 3D Semantic Mapping with Convolutional Neural Networks", arXiv:1609.05130v2, Sep. 28, 2016, 7 pages.
Meng, "GNeRF: GAN-based Neural Radiance Field without Posed Camera", arXiv:2103.15606v3, Aug. 18, 2021, 12 pages.
Mescheder et al., "Occupancy Networks: Learning 3D Reconstruction in Function Space", arXiv:1812.03828v2, Apr. 30, 2019, 11 pages.
Meyer et al., "Improving Unimodal Object Recognition with Multimodal Contrastive Learning", 2020 Institute of Electrical and Electronics Engineers /RSJ International Conference on Intelligent Robots and Systems (IROS), Oct. 25-29, 2020, Las Vegas, Nevada, USA, 8 pages.
Mildenhall et al., "NeRF: Representing Scenes as Neural Radiance Fields for View Synthesis", arXiv:2003.08934v2, Aug. 3, 2020, 25 pages.
Milioto et al., "RangeNet++: Fast and Accurate LiDAR Semantic Segmentation", 2019 Institute of Electrical and Electronics Engineers /RSJ International Conference on Intelligent Robots and Systems (IROS), Macau, China, Nov. 4-8, 2019, 8 pages.
Minaee et al., "Image Segmentation Using Deep Learning: A Survey.", arXiv:2001.05566v5, Nov. 15, 2020, 22 pages.
Murez et al., "Atlas: End-to-End 3D Scene Reconstruction from Posed Images", arXiv:2003.10432v3, Oct. 14, 2020, 18 pages.
Nagrani et al., "Speech2Action: Cross-modal Supervision for Action Recognition", arXiv:2003.13594v1, Mar. 30, 2020, 14 pages.
Neff, "DONeRF: Towards Real-Time Rendering of Compact Neural Radiance Fields using Depth Oracle Networks", arXiv:2103. 03231v4, Jun. 25, 2021, 15 pages.

(56) References Cited

OTHER PUBLICATIONS

Niemeyer et al., "Differentiable Volumetric Rendering: Learning Implicit 3D Representations without 3D Supervision", arXiv:1912.07372v2, Mar. 23, 2020, 12 pages.

Niemeyer et al., "GIRAFFE: Representing Scenes as Compositional Generative Neural Feature Fields", arXiv:2011.12100v2, Apr. 29, 2021, 12 pages.

Noguchi, "Neural Articulated Radiance Field", arXiv:2104.03110v2, Aug. 18, 2021, 16 pages.

Oechsle et al., "UNISURF: Unifying Neural Implicit Surfaces and Radiance Fields for Multi-View Reconstruction", arXiv:2104.10078v2, Oct. 8, 2021, 11 pages.

Owens et al., "Ambient Sound Provides Supervision for Visual Learning", arXiv:1608.07017v2, Dec. 5, 2016, 20 pages.

Park et al., "DeepSDF: Learning Continuous Signed Distance Functions for Shape Representation", arXiv:1901.05103v1, Jan. 16, 2019, 19 pages.

Park et al., "Nerfies: Deformable Neural Radiance Fields", arXiv:2011.12948v5, Sep. 10, 2021, 18 pages.

Peng et al., "Convolutional Occupancy Networks", arXiv:2003.04618v2, Aug. 1, 2020, 17 pages.

Peng et al., "Neural Body: Implicit Neural Representations with Structured Latent Codes for Novel View Synthesis of Dynamic Humans", arXiv:2012.15838v2, Mar. 29, 2021, 10 pages.

Pham et al., "JSIS3D; Joint Semantic-Instance Segmentation of 3D Point Clouds with Multi-Task Pointwise Networks and Multi-Value Conditional Random Fields", arXiv:1904.00699v2, Apr. 5, 2019, 10 pages.

Qi et al., "PointNet: Deep Learning on Point Sets for 3D Classification and Segmentation", arXiv:1612.00593v2, Apr. 10, 2017, 19 pages.

Qi et al., "PointNet++: Deep Hierarchical Feature Learning on Point Sets in a Metric Space", arXiv:1706.02413v1, Jun. 7, 2017, 14 pages.

Rebain et al., "DeRF: Decomposed Radiance Fields", arXiv:2011.12490v1, Nov. 25, 2020, 14 pages.

Reigler et al., "OctNet: Learning Deep 3D Representations at High Resolutions", arXiv:1611.05009v4, Apr. 10, 2017, 21 pages.

Reiser et al., "KiloNeRF: Speeding Up Neural Radiance Fields with Thousands of Tiny MLPs." arXiv:2103.13744v2, Aug. 2, 2021, 11 pages.

Rematas et al., "ShaRF: Shape-conditioned Radiance Fields from a Single View", arXiv:2102.08860v2, Jun. 23, 2021, 11 pages.

Ronneberger et al., "U-Net: Convolutional Networks for Biomedical Image Segmentation", arXiv:1505.04597v1, May 18, 2015, 8 pages.

Saito et al., "PIFu: Pixel-Aligned Implicit Function for High-Resolution Clothed Human Digitization", arXiv:1905.05172v3, Dec. 3, 2019, 15 pages.

Schwarz et al., "Generative Radiance Fields for 3D-Aware Image Synthesis", arXiv:2007.02442v4, Mar. 30, 2021, 13 pages.

Shi et al., "PV-RCNN: Point-Voxel Feature Set Abstraction for 3D Object Detection", arXiv:1912.13192v2, Apr. 9, 2021, 11 pages.

Song et al., "Semantic Scene Completion from a Single Depth Image", arXiv:1611.08974v1, Nov. 28, 2016, 14 pages.

Srinivasan et al., "NeRV: Neural Reflectance and Visibility Fields for Relighting and View Synthesis", arXiv:2012.03927v1, Dec. 7, 2020, 12 pages.

Straub et al., "The Replica Dataset: A Digital Replica of Indoor Spaces", arXiv:1906.05797v1, Jun. 13, 2019, 10 pages.

Sucar et al., "iMAP: Implicit Mapping and Positioning in Real-Time", arXiv:2103.12352v2, Sep. 13, 2021, 10 pages.

Sun et al., "Scalability in Perception for Autonomous Driving: Waymo Open Dataset", arXiv:1912.04838v7, May 12, 2020, 9 pages.

Takikawa, "Neural Geometric Level of Detail: Real-time Rendering with Implicit 3D Shapes", arXiv:2101.10994v1, Jan. 26, 2021, 16 pages.

Thomas et al., "KPConv: Flexible and Deformable Convolution for Point Clouds", arXiv:1904.08889v2, Aug. 19, 2019, 15 pages.

Tian et al., "Contrastive Multiview Coding", arXiv:1906.05849v5, Dec. 18, 2020, 16 pages.

Tran et al., "Learning Spatiotemporal Features with 3D Convolutional Networks", arXiv:1412.0767v4, Oct. 7, 2015, 16 pages.

Trestschk et al., "Non-Rigid Neural Radiance Fields: Reconstruction and Novel View Synthesis of a Dynamic Scene from Monocular Video", arXiv:2012.12247v4, Aug. 23, 2021, 20 pages.

Ubuntu Manuals, "Blender—a 3D Modelling and Rendering Package", https:/ /manpages .ubunt u.com/ manpages/bionic/man1/ blender.1.html, 2018, retrieved on Feb. 23, 2023, 8 pages.

Vineet et al., "Incremental Dense Semantic Stereo Fusion for Large-Scale Semantic Scene Reconstruction", 2015 Institute of Electrical and Electronics Engineers International Conference on Robotics and Automation (ICRA), Seattle, Washington, United States, May 26-30, 2015, 8 pages.

Vora et al., "PointPainting: Sequential Fusion for 3D Object Detection", arXiv:1911.10150v2, May 6, 2020, 11 pages.

Wang et al., "IBRNet: Learning Multi-View Image-Based Rendering", arXiv:2102.13090v2, Apr. 6, 2021, 15 pages.

Wang et al., "NeRF—: Neural Radiance Fields Without Known Camera Parameters", arXiv:2102.07064v4, Apr. 6, 2022, 17 pages.

Wang et al., "Weakly Supervised Semantic Segmentation in 3D Graph-Structured Point Clouds of Wild Scenes", arXiv:2004.12498v2, May 17, 2020, 14 pages.

Wu et al., "Wider or Deeper: Revisiting the ResNet Model for Visual Recognition", Wider or Deeper: Revisiting the ResNet Model for Visual Recognition, arXiv:1611.10080v1, Nov. 30, 2016, 19 pages.

Yariv et al., "Multiview Neural Surface Reconstruction by Disentangling Geometry and Appearance", arXiv:2003.09852v3, Oct. 25, 2020, 18 pages.

Yen-Chen et al., "iNeRF: Inverting Neural Radiance Fields for Pose Estimation", arXiv:2012.05877v3, Aug. 10, 2021, 9 pages.

Yu et al., "pixelNeRF: Neural Radiance Fields from One or Few Images", arXiv:2012.02190v3, May 30, 2021, 20 pages.

Yu et al., "PlenOctrees for Real-time Rendering of Neural Radiance Fields", arXiv:2103.14024v2, Aug. 17, 2021, 18 pages.

Yuan et al., "STaR: Self-supervised Tracking and Reconstruction of Rigid Objects in Motion with Neural Rendering", arXiv:2101.01602v1, Dec. 22, 2020, 12 pages.

Zaal et al., "HDRI's Haven", https:// polyhaven. com/hdris, retrieved on Feb. 23, 2023, 10 pages.

Zhang et al., "Large-Scale 3D Semantic Mapping Using Monocular Vision", 2019 Institute of Electrical and Electronics Engineers 4th International Conference on Image, Vision, and Computing (ICIVC), Xiamen, China, Jul. 5-7, 2019, pp. 71-76.

Zhang et al., "NeRFactor: Neural Factorization of Shape and Reflectance Under an Unknown Illumination", arXiv:2106.01970v2, Dec. 22, 2021, 18 pages.

Zhang et al., "PolarNet: An Improved Grid Representation for Online LiDAR Point Clouds Semantic Segmentation", arXiv:2003.14032v2, Apr. 26, 2020, 10 pages.

Zhao et al., "The Sound of Pixels", arXiv:1804.03160v4, Oct. 14, 2018, 17 pages.

Zhi et al., "In-Place Scene Labelling and Understanding with Implicit Scene Representation", arXiv:2103.15875v2, Aug. 21, 2021, 14 pages.

Zhu et al., "Cylindrical and Asymmetrical 3D Convolution Networks for LiDAR Segmentation", arXiv:2011.10033v1, Nov. 19, 2020, 10 pages.

* cited by examiner

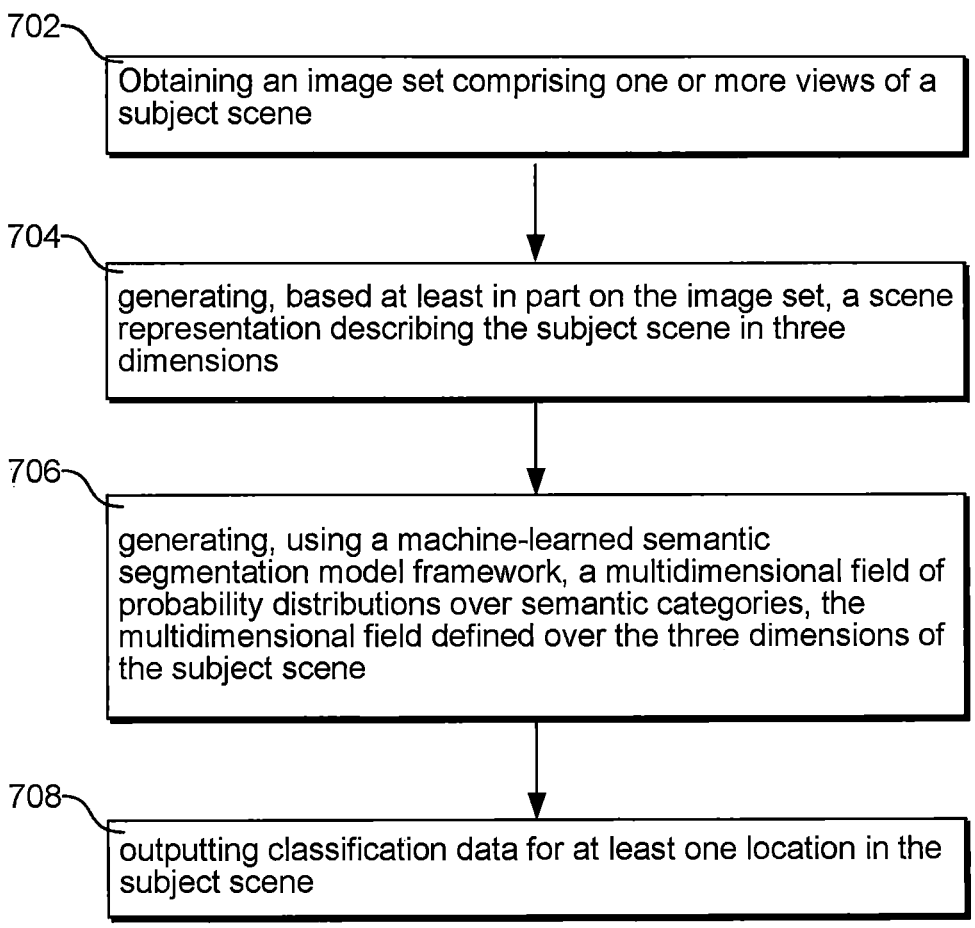

700

702 — Obtaining an image set comprising one or more views of a subject scene

704 — generating, based at least in part on the image set, a scene representation describing the subject scene in three dimensions 706 — generating, using a machine-learned semantic segmentation model framework, a multidimensional field of probability distributions over semantic categories, the multidimensional field defined over the three dimensions of the subject scene 708 — outputting classification data for at least one location in the subject scene

Figure 7

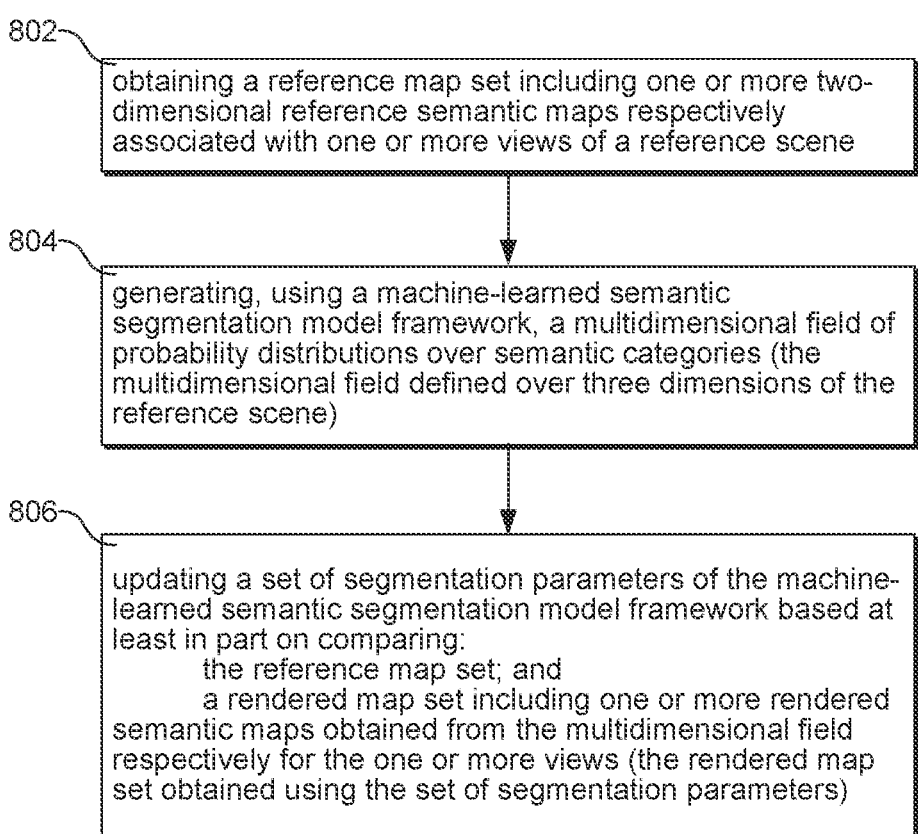

800

802 — obtaining a reference map set including one or more two-dimensional reference semantic maps respectively associated with one or more views of a reference scene 804 — generating, using a machine-learned semantic segmentation model framework, a multidimensional field of probability distributions over semantic categories (the multidimensional field defined over three dimensions of the reference scene)

806 — updating a set of segmentation parameters of the machine-learned semantic segmentation model framework based at least in part on comparing:
        the reference map set; and
        a rendered map set including one or more rendered semantic maps obtained from the multidimensional field respectively for the one or more views (the rendered map set obtained using the set of segmentation parameters)

Figure 8

NEURAL SEMANTIC FIELDS FOR GENERALIZABLE SEMANTIC SEGMENTATION OF 3D SCENES

PRIORITY CLAIM

The present application is based upon and claims the right of priority under 35 U.S.C. § 371 to International Application No. PCT/US2022/046164, filed on Oct. 10, 2022. International Application No. PCT/US2022/046164 is hereby incorporated by reference herein in its entirety. International Application No. PCT/US2022/046164 is based on and claims priority to U.S. Provisional Patent Application No. 63/279,864, filed Nov. 16, 2021. U.S. Provisional Patent Application No. 63/279,864 is hereby incorporated by reference herein in its entirety.

FIELD

The present disclosure relates generally to semantic segmentation of visual recordings. More particularly, the present disclosure relates to semantic segmentation of three-dimensional scenes based on two-dimensional image captures.

BACKGROUND

Machine vision applications employ various sensors to obtain data describing an environment. It can be desired to predict high-level information about the environment based on the obtained data.

SUMMARY

Aspects and advantages of embodiments of the present disclosure will be set forth in part in the following description, or can be learned from the description, or can be learned through practice of the embodiments.

In an example aspect, the present disclosure provides a first example computer-implemented method for constructing a three-dimensional semantic segmentation of a scene from two-dimensional inputs. The first example method includes obtaining, by a computing system including one or more processors, an image set comprising one or more views of a subject scene. The first example method includes generating, by the computing system and based at least in part on the image set, a scene representation describing the subject scene in three dimensions. The first example method includes generating, by the computing system and using a machine-learned semantic segmentation model framework, a multidimensional field of probability distributions over semantic categories, the multidimensional field defined over the three dimensions of the subject scene. The first example method includes outputting, by the computing system, classification data for at least one location in the subject scene.

In some embodiments of the first example method, the image set is unsegmented (e.g., unlabeled, such as in some examples lacking complete semantic mapping information).

In some embodiments of the first example method, the scene representation is based at least in part on a machine-learned density model evaluated over a multidimensional lattice.

In some embodiments of the first example method, the multidimensional field is based at least in part on an interpolation of a machine-learned feature lattice.

In some embodiments of the first example method, the first example method includes outputting, by the computing system and using a volumetric rendering, a two-dimensional semantic map of the subject scene.

In some embodiments of the first example method, the first example method includes obtaining, by the computing system, a second image set including one or more views of a second subject scene. In some embodiments of the first example method, the example first method includes generating, by the computing system and based at least in part on the second image set, a second scene representation describing the second subject scene in three dimensions. In some embodiments of the first example method, the first example method includes generating, by the computing system and using the machine-learned semantic segmentation model framework, a second multidimensional field of probability distributions over semantic categories, the second multidimensional field defined over the three dimensions of the second subject scene.

In some embodiments of the first example method, the machine-learned semantic segmentation model framework includes a first machine-learned model configured to generate the scene representation according to a set of scene-specific weights. In some embodiments of the first example method, the first machine-learned model is configured to generate the second scene representation according to a second set of scene-specific weights. In some embodiments of the first example method, the first machine-learned model is trained independently of the machine-learned semantic segmentation model framework. In some embodiments of the first example method, the machine-learned semantic segmentation model framework includes a second machine-learned model configured to generate the multidimensional field according to a set of segmentation weights shared across scenes.

In an example aspect, the present disclosure provides for a second example computer-implemented method for three-dimensional semantic segmentation of a scene. The second example method includes obtaining, by a computing system including one or more processors, a reference map set including one or more two-dimensional reference semantic maps respectively associated with one or more views of a reference scene. The second example method includes generating, by the computing system and a machine-learned semantic segmentation model framework, a multidimensional field of probability distributions over semantic categories, the multidimensional field defined over three dimensions of the reference scene. The second example method includes updating, by the computing system, a set of segmentation parameters of the machine-learned semantic segmentation model framework based at least in part on comparing the reference map set and a rendered map set containing one or more rendered semantic maps obtained from the multidimensional field respectively for the one or more views, the rendered map set obtained using the set of segmentation parameters.

In some embodiments of the second example method, the machine-learned semantic segmentation model framework includes a first machine-learned model configured to generate the multidimensional field based at least in part on a scene representation describing the reference scene in three dimensions. In some embodiments of the second example method, the machine-learned semantic segmentation model framework includes a second machine-learned model configured to generate the scene representation based at least in part on the one or more views.

In some embodiments of the second example method, the second machine-learned model is trained independently from the first machine-learned model. In some embodiments of the second example method, the second machine-learned model includes a scene-specific weight set trained over the one or more views.

In an example aspect, the present disclosure provides for an example system for three-dimensional semantic segmentation of a scene, the system including one or more processors and one or more computer-implemented media storing instructions that, when executed, cause the one or more processors to perform operations, the operations including the first and/or the second example method(s).

In an example aspect, the present disclosure provides for an example computer-implemented medium storing instructions that, when executed, are configured to cause one or more processors to perform operations, the operations including the first and/or the second example method(s).

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which references the appended figures.

FIG. 7 depicts an example flow diagram for implementing an example semantic segmentation model framework according to example embodiments of the present disclosure.

FIG. 8 depicts an example flow diagram for implementing an example semantic segmentation model framework according to example embodiments of the present disclosure.

Figure 1A:
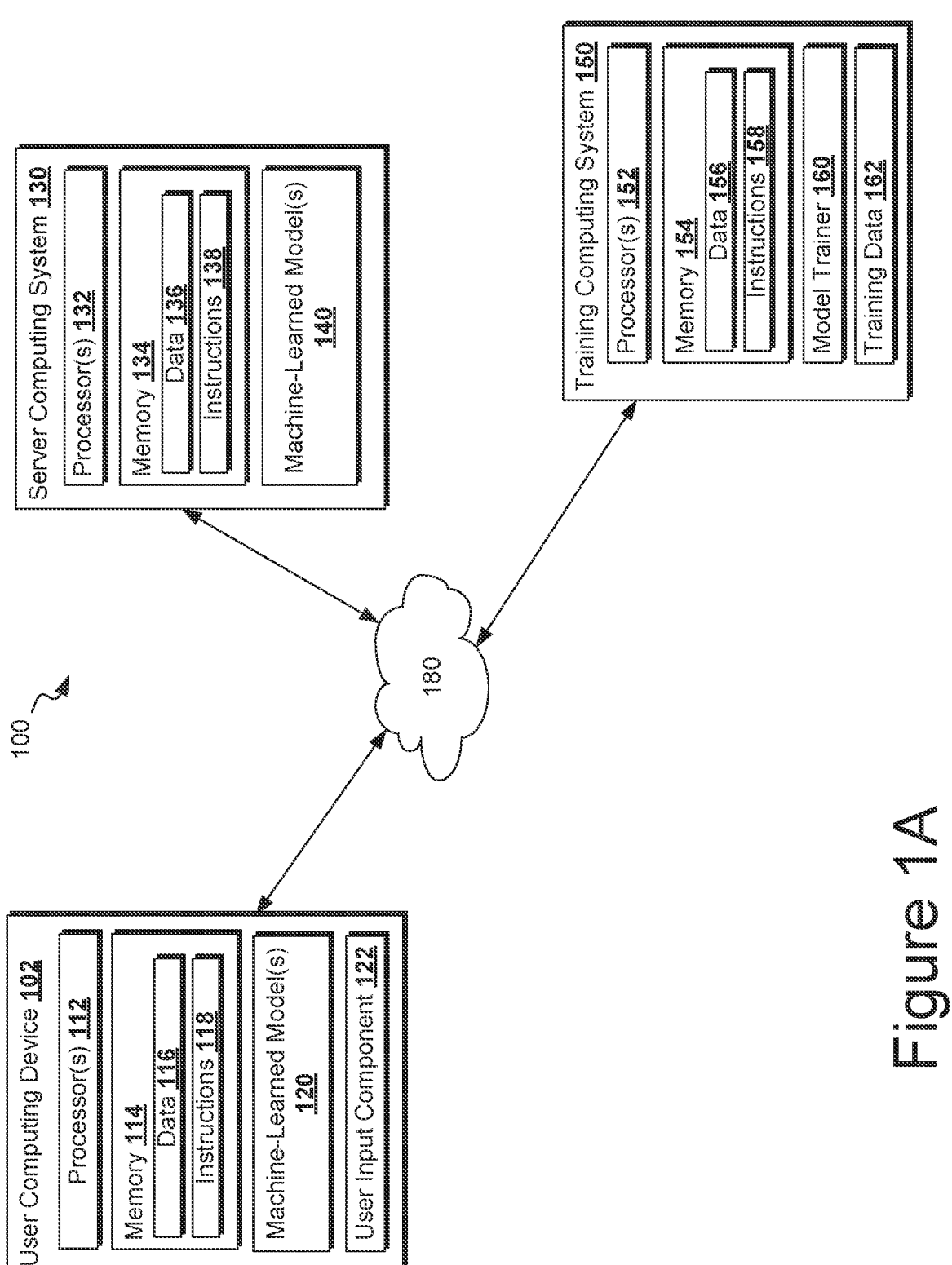
FIG. 1A depicts a block diagram of an example computing system that performs semantic segmentation according to example embodiments of the present disclosure.

Reference numerals that are repeated across plural figures are intended to identify the same features in various implementations.

DETAILED DESCRIPTION

Overview

Generally, the present disclosure is directed to semantic segmentation of three-dimensional scenes. Semantic segmentation generally refers to the identification or classification of regions of data based on high-level associations within the data. For example, an example three-dimensional scene might include a lawn, a dog sitting on the lawn, and a tree in the background. An example semantic segmentation of the scene can include an indication of what portions or "segments" of the scene correspond to the lawn, to the dog, and to the tree. In three dimensions, for example, a semantic segment can correspond to one or more locations in space (e.g., a volume) associated with a classification. If the scene is imaged in two dimensions from a particular point of view, a semantic segment can correspond to one or more locations in the image (e.g., an area) associated with a classification when imaged from that point of view.

Three-dimensional scene representations with semantic segmentation offer significant advantages over two-dimensional images. For example, a three-dimensional scene representation can better represent real-world environments, which are three-dimensional in space. Accordingly, three-dimensional semantic segmentation can provide for an improved understanding of spatial relationships between classified regions (e.g., objects), as well as an ability to render two-dimensional semantically segmented images of the scene from arbitrary points of view.

Traditionally, three-dimensional, semantically segmented scene representations can be challenging to produce, as prior methods generally require three-dimensional annotated reference data (e.g., annotated point clouds containing class labels for the points). Three-dimensional annotated reference data can be costly to obtain, generally requiring complex sensors for generating the scene representations and/or expensive (e.g., computationally, labor-wise, etc.) labeling processes.

Example embodiments of the present disclosure provide for semantic fields. In some examples, embodiments can provide techniques for semantic segmentation of 3D scenes via image-space (e.g., 2D) semantic annotations. In place of (or in augment to) an explicit 3D representation, semantic fields can leverage the implicit representations of geometry recovered by neural radiance field techniques. For instance, example embodiments implement a neural network to process a density field from a neural radiance field model to predict a semantic field for a scene. A semantic field can include a coordinate-wise function mapping 3D points to probability distributions over semantic categories. From this 3D field, example embodiments can recover 2D semantic maps using volumetric rendering, providing for supervised learning from 2D posed semantic annotations in image-space.

Advantageously, example embodiments of systems and methods of the present disclosure provide for semantic segmentation of three-dimensional scenes reconstructed from two-dimensional images of the scenes, which are generally easier and cheaper to obtain than three-dimensional scene data. For example, an example machine-learned semantic segmentation model framework of the present disclosure can receive as an input a set of two-dimensional images depicting a scene and output a three-dimensional representation of the scene and/or semantic classification of one or more locations within the three-dimensional scene. In this manner, for instance, example embodiments of aspects of the present disclosure provide for improved representations of three-dimensional scenes using two-dimensional inputs.

In another advantageous aspect, an example machine-learned semantic segmentation model framework of the present disclosure can be trained to semantically segment a reconstructed three-dimensional scene using two-dimensional "ground truth" or reference data. Two-dimensional reference data (e.g., semantically segmented maps of images) can be generally easier and cheaper to obtain (e.g., to manually and/or automatically label) than a three-dimensional semantic mapping. In this manner, for instance, example embodiments of aspects of the present disclosure provide for improved semantic mapping of three-dimensional scenes using two-dimensional training data (e.g., optionally only using 2D training data).

In another advantageous aspect, an example machine-learned semantic segmentation model framework of the present disclosure can provide for improved data efficiency. For example, by training using two-dimensional training data, the example machine-learned semantic segmentation model framework of the present disclosure can learn segmentation model parameters using less annotated data (e.g., less costly data). Furthermore, not only are example embodiments of a machine-learned semantic segmentation model framework of the present disclosure generally able to be trained using less expensive data, some example embodiments can also be trained using fewer annotated training instances. For example, in some embodiments, as few as a single annotated view of a set of views of a training scene (e.g., of a plurality of training scenes) can be used to train a machine-learned semantic segmentation model framework of the present disclosure. In this manner, for instance, example embodiments of aspects of the present disclosure provide for improved semantic mapping of three-dimensional scenes using training data that can be easier to obtain.

In another advantageous aspect, an example machine-learned semantic segmentation model framework of the present disclosure can provide for improved handling of occlusions in one or more input images. For example, in some embodiments, an example machine-learned semantic segmentation model framework of the present disclosure can generate a three-dimensional scene representation from two-dimensional images while accounting for occlusions. For instance, an example machine-learned semantic segmentation model framework of the present disclosure can be trained to semantically map a three-dimensional scene representation based on one or more two-dimensional semantic map references while reasoning about any occlusions in the scene (e.g., from the viewpoint(s) of the one or more two-dimensional semantic map references). For instance, although an occlusion may block a given two-dimensional point of view, possession of a three-dimensional mapping of the scene can provide for an understanding of what is behind the occlusion.

Example embodiments according to aspects of the present disclosure can provide for various technical effects and benefits. For example, some embodiments according to aspects of the present disclosure can provide for semantic segmentation of three-dimensional scenes for which three-dimensional reference data may be impossible to obtain (e.g., due to temporal, environmental, legal, technological, or other constraints, etc., or due to the destruction of the scene). For example, some embodiments according to aspects of the present disclosure can provide for improved machine vision applications that have expanded high-level understanding and awareness of an environment, advantageously without requiring complex three-dimensional scanners, ranging or other depth detection technologies, or other three-dimensional imaging requirements. For instance, example embodiments according to aspects of the present disclosure can provide for three-dimensional reconstruction of a scene—and the semantic segmentation of the scene— from two-dimensional images of the scene, which can be captured, stored, transmitted, retrieved, and processed with relative ease, speed, and low computational expense as compared to direct three-dimensional data captures.

In this manner, for instance, embodiments according to aspects of the present disclosure can expand the sensing, detection, and understanding provided by two-dimensional imaging sensors by improving and expanding the functionality of computing devices as described herein for processing image(s). For example, some embodiments according to aspects of the present disclosure can provide for helping robots understand an environment (e.g., "where can I grasp this mug?"), self-driving cars understand surroundings (e.g., "where are the pedestrians?," "where are the cars?," etc.), etc. In general, the proposed method is applicable wherever images and videos can be captured to enhance and expand the functionality of the computational systems to understand and interact with the world around them.

For example, by providing for semantic segmentation of three-dimensional scenes reconstructed from two-dimensional images of the scenes, example embodiments according to the present disclosure can provide for decreased storage, memory, bandwidth (e.g., network bandwidth) for retaining, processing, and transmitting data for generating semantically segmented three-dimensional scenes. In this manner, for example, computational resources can be conserved in example embodiments by handling two-dimensional inputs (e.g., instead of three-dimensional inputs). Additionally, in this manner, for example, limited computational resources can be extended further to achieve additional capabilities and/or throughput when generating semantically segmented scenes according to example embodiments of the present disclosure. Thus, example embodiments of the present disclosure can improve and expand the functionality of example computing devices described herein.

With reference now to the Figures, example embodiments of the present disclosure will be discussed in further detail.

Example Devices and Systems

FIG. 1A depicts a block diagram of an example computing system 100 that performs semantic segmentation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more semantic segmentation models 120 (which can include, for example, a framework of one or more models). For example, the semantic segmentation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example semantic segmentation models 120 are discussed with reference to FIGS. 1 to 8.

In some implementations, the one or more semantic segmentation models 120 can be received from the server computing system 130 over network 180, stored in the user computing device memory 114, and then used or otherwise implemented by the one or more processors 112. In some implementations, the user computing device 102 can implement multiple parallel instances of a single semantic segmentation model 120 (e.g., to perform parallel semantic segmentation across multiple instances).

Additionally or alternatively, one or more semantic segmentation models 140 can be included in or otherwise stored and implemented by the server computing system 130 that communicates with the user computing device 102 according to a client-server relationship. For example, the semantic segmentation models 140 can be implemented by the server computing system 130 as a portion of a web service (e.g., a semantic segmentation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more semantic segmentation models 140 (which can include, for example, a framework of one or more models). For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1 to 8.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the semantic segmentation models 120 and/or 140 based on a set of training data 162. The training data 162 can include, for example, set of images of one or more training scenes from a plurality of views. In some embodiments, a training scene (e.g., each training scene of a plurality of training scenes) is associated with one or more semantic maps.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
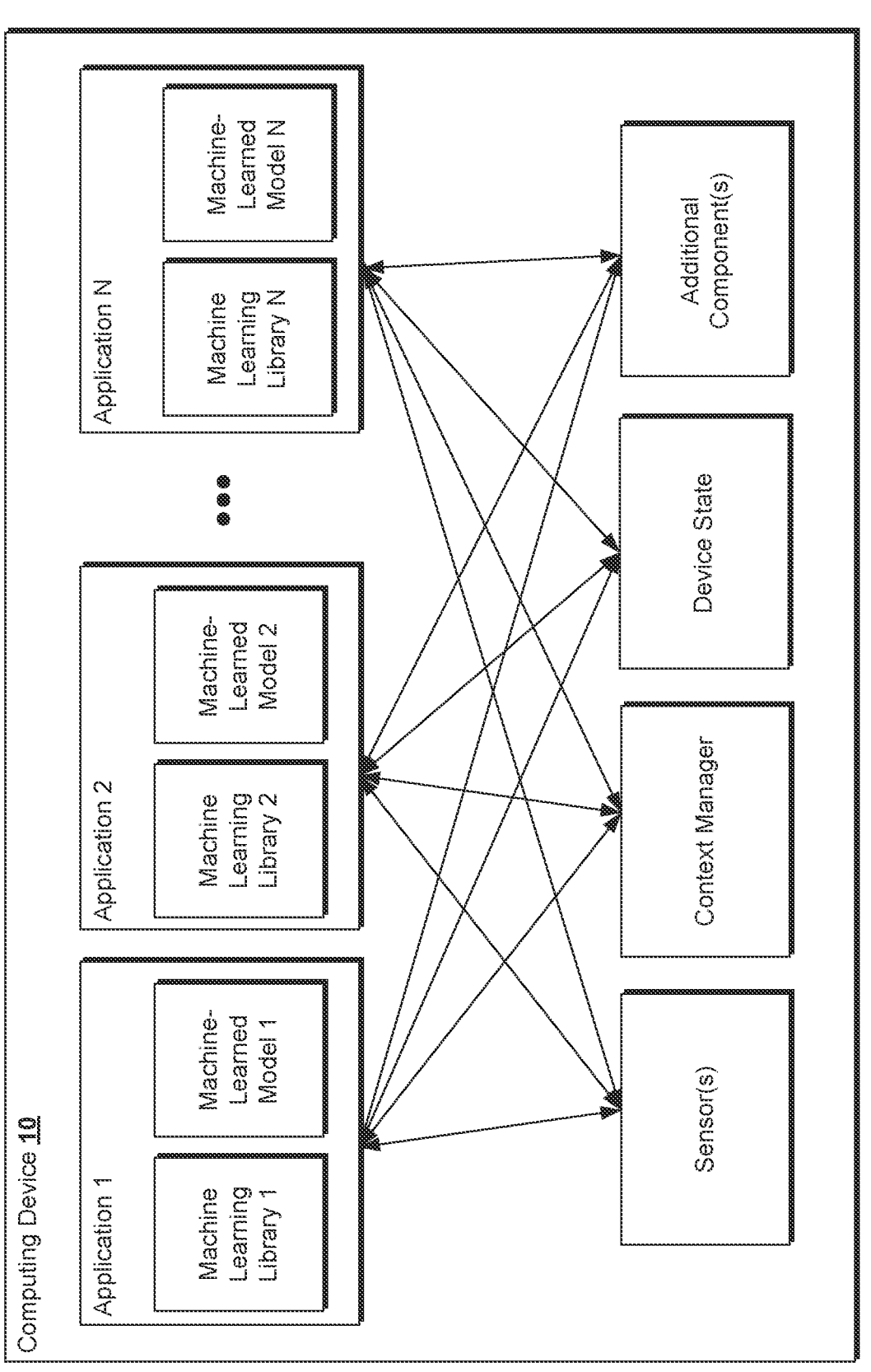
FIG. 1B depicts a block diagram of an example computing device that performs semantic segmentation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
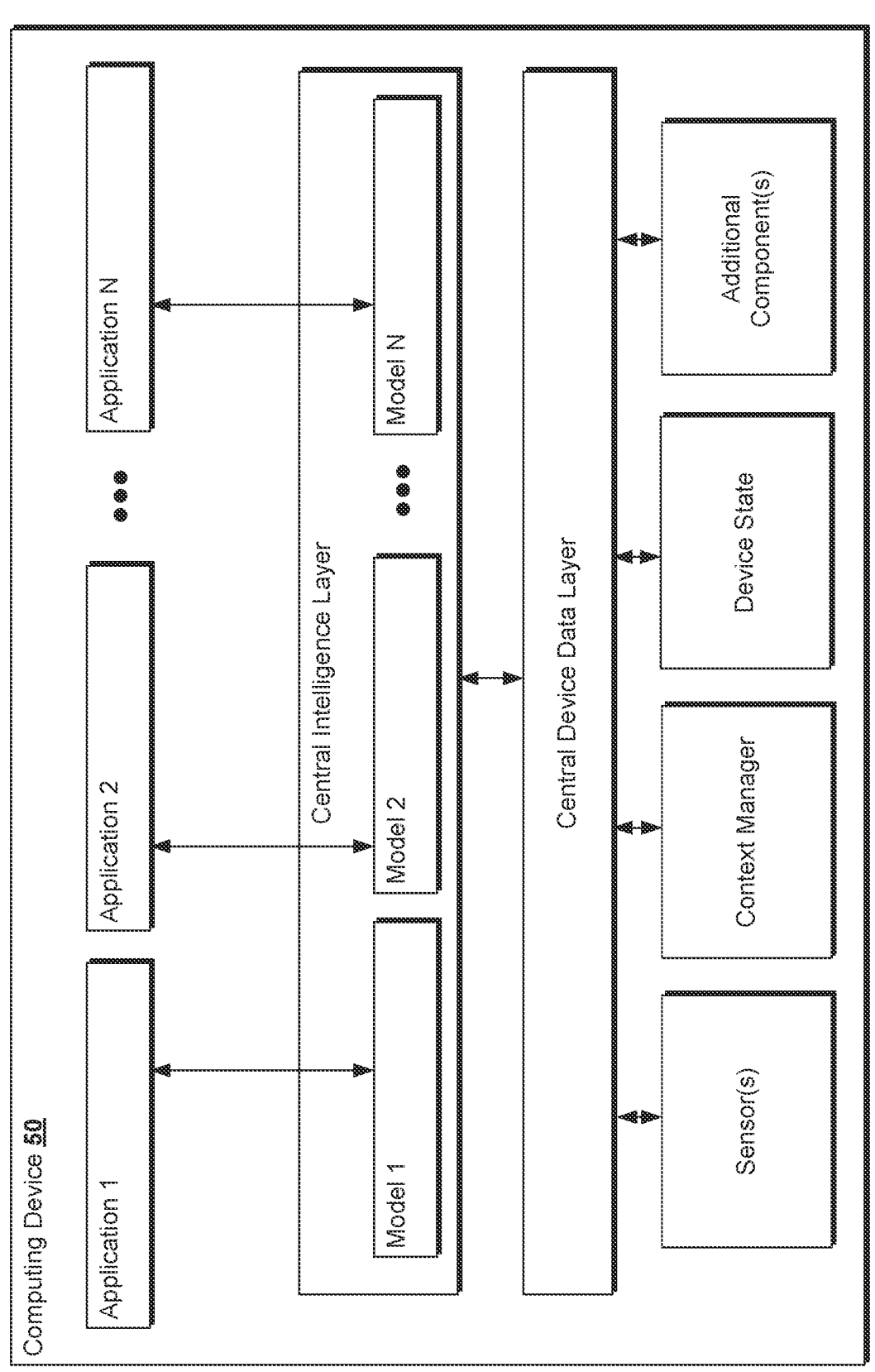
FIG. 1C depicts a block diagram of an example computing device that performs semantic segmentation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2A:
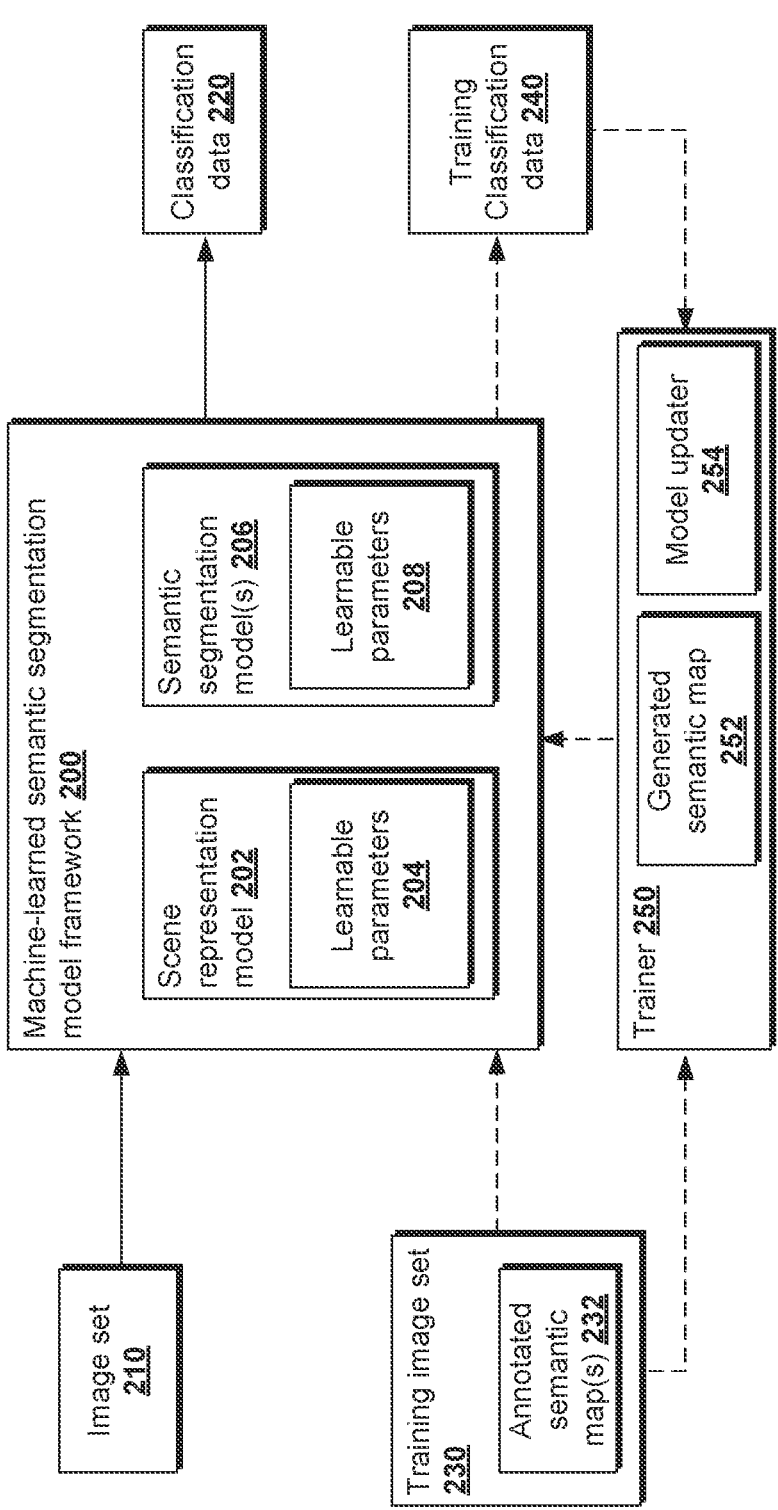
FIG. 2A depicts a block diagram of an example semantic segmentation model framework according to example embodiments of the present disclosure.

FIG. 2A depicts an example machine-learned semantic segmentation model framework 200 according to example aspects of the present disclosure. The framework 200 can include a scene representation model 202 (e.g., a machine-learned model with learnable parameters 204) and a semantic segmentation model 206 (e.g., a machine-learned model with learnable parameters 208). In some embodiments, at inference, an image set 210 (e.g., containing one or more images of a scene) can be input to the machine-learned semantic segmentation model framework 200 to obtain classification data 220. During training (indicated with dashed lines), a training image set 230 (e.g., associated with annotated semantic map(s) 232) can be input to the framework 200 to obtaining training classification data 240. The training classification data 240 (and optionally the training image set 230 or the annotated semantic maps 232) can be input to trainer 250 for training the machine-learned models of the framework 200 (e.g., the scene representation model 202, the semantic segmentation model 206, or both). The trainer 250 can update one or more learnable parameters by obtaining generated semantic map(s) 252 and comparing the generated semantic map(s) 252 to the annotated semantic map(s) 232. Based on the comparison, the model updater 254 can update one or more parameter(s) of the model(s) (e.g., one or more parameters of the scene representation model 202, semantic segmentation model 206, etc.).

In some embodiments, the machine-learned semantic segmentation model framework 200 can include one or more machine-learned models. For instance, a first machine-learned model can include a scene representation model, such as scene representation model 202. Scene representation model 202 can include learned model(s) that can generate, encode, or otherwise represent a multidimensional scene or views thereof based on one or more inputs.

In some embodiments, learnable parameters 204 can be learned on a per-scene basis. For instance, in some embodiments, learnable parameters 204 can be optimized such that the scene representation model can be used to reconstruct a scene from the image set 210. For instance, in some embodiments, scene representation model 202 can be trained on image set 210 (e.g., only on image set 210, fine-tuned on image set 210, etc.).

For instance, given an image set 210, the scene representation model 202 can be trained to generate a three-dimensional scene such that the image set 210 can be reconstructed from the generated three-dimensional scene. For instance, the parameters 204 of the scene representation model 202 can be iteratively updated such that a three-dimensional scene generated from the image set 210 can provide for more accurate reconstructions of the image set 210 using photometric reconstruction based on rays from viewpoint(s) associated with the images of the image set 210.

In some embodiments, scene representation model 202 can include a neural radiance field model (NeRF model). In some examples, example NeRF models can be trained on one or more views of a scene to output representations of other view(s) of the scene. In some instances, the parameters of the NeRF model can learn or encode a latent representation of geometry of a three-dimensional scene. It is to be understood that other machine-learned models, including machine-learned field models, can be used as a scene representation model 202.

Figure 2B:
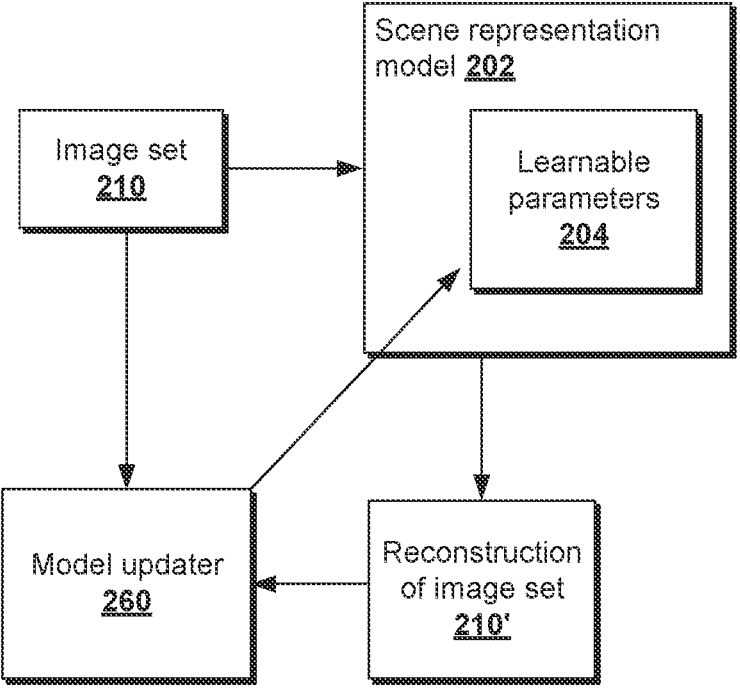
FIG. 2B depicts a block diagram of an example scene representation model arrangement according to example embodiments of the present disclosure.

FIG. 2B illustrates one example arrangement of scene representation model 202. Learnable parameters 204 can be updated by model updater 260 based on a comparison of the image set 210 and a reconstruction of the image set 210' (e.g., based on one or more losses). The learnable parameters 204 can be scene-specific, learned to provide for the output of geometric representation(s) of the scene imaged by the image set 210.

In some embodiments, the latent geometric representation obtained using the scene representation model 202 can include a learned density of the scene (e.g., a volumetric density). For example, in some embodiments, given a collection of posed RGB images $$\{C_c^{gt}, \gamma_c\}$$

and denoting as $r \sim \mathcal{R}(\gamma_c)$ rays corresponding to pixels from image $$C_c^{gt},$$

a scene representation model 202 with learnable parameters $\theta$ can be trained, in some examples, by minimizing the squared photometric reconstruction loss presented in Equation 1.

$$\mathcal{L}_{rgb}(\theta) = \sum_c \mathbb{E}_{r \sim \mathcal{R}(\gamma_c)} \left[ \| C(r|\theta) - C_c^{gt}(r) \|_2^2 \right] \tag{1}$$

In Equation 1, $$C_c^{gt}(r)$$

is the ground truth color of a ray passing through a pixel in image c, and the color $C$ $(r|\theta)$ can be computed by applying the volumetric rendering equation, such as is presented in Equation 2.

$$C(r|\theta) = \int_{t_n}^{t_f} w(t|\theta) \cdot c(t|\theta) dt \tag{2}$$

In Equation 2, the ray's near and far bounds are given by $t \in [t_n, t_f]$, and c(t) corresponds to a radiance field.

In an example notation, let r(t)=o+td represent a point along a ray with origin o and direction d. Weight w(t)=w(r(t)) can then be expressed as in Equation 3.

$$w(t) = \exp\left(-\int_{t_n}^{t} \sigma(u) du\right) \cdot \sigma(t) \tag{3}$$

In some examples, the exp term of Equation 3 can correspond to a visibility of the point r(t) from o, and the term $\sigma(t)$ can correspond to a density at the point r(t). For instance, $\sigma(t)$ can correspond to a volumetric density. In some embodiments, at least one of the density or the radiance field can be generated or otherwise output (e.g., predicted) by a machine-learned model. For instance, a multilayer perceptron can be trained to output at least one of the density or the radiance field.

In some embodiments, the latent geometric representation can include a learned representation of aspects or characteristics of the geometry of a 3D scene. In some embodiments, the latent geometric representation can be encoded in a set of machine-learned parameters. For instance, the latent geometric representation can be encoded in a model that uses a set of learned parameters that was trained on a given scene.

In some embodiments, semantic segmentation model 206 can be trained to process the latent geometric representation to generate a semantic mapping of the scene. For instance, an input geometric representation of the scene can be mapped to a semantic representation of the scene. For example, a latent geometric representation of a scene can correspond to a density of a volume (e.g., a 3D scene), and the semantic segmentation model 206 can be trained to generate a semantic mapping over that volume that segments the volume based on the semantic understanding of distinct regions of the volume (e.g., different objects, different subjects, etc.). For instance, 3D density fields can be mapped to 3D semantic fields.

In some embodiments, the learnable parameters 208 can be shared across multiple scenes. For instance, the learnable parameters 208 can be obtained by training the semantic segmentation model 206 across a number of training example scenes. For example, in some embodiments, semantic segmentation model 206 can be trained over training image set 230.

In this manner, for example, the scene representation model 202 can include learnable parameters 204 that are adapted specifically to represent the particular scene of interest (depicted in image set 210), and the semantic segmentation model 206 can include learnable parameters 208 that are adapted to encode higher-level, global understandings of how to reason over a geometric representation (e.g., a density field) to obtain semantic features for performing semantic segmentation. In this manner, for instance, learnable parameters 208 can be shared across scenes and facilitate generalization to processing novel scenes (e.g., scenes over which the semantic segmentation model 206 was not trained).

Figure 2C:
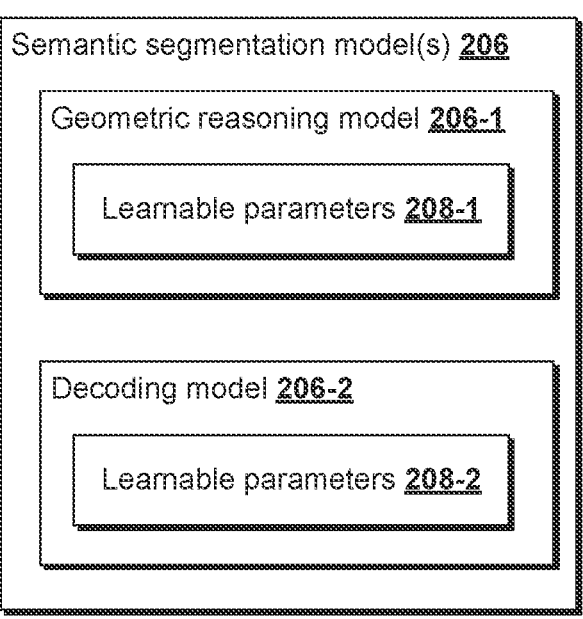
FIG. 2C depicts a block diagram of an example semantic segmentation model arrangement according to example embodiments of the present disclosure.

FIG. 2C illustrates one example arrangement of semantic segmentation model(s) 206. Semantic segmentation model(s) 206 can include a geometric reasoning model 206-1 with learnable parameters 208-1 and a decoding model 206-2 with learnable parameters 208-2. Geometric reasoning model 206-1 and decoding model 206-2 can be any suitable machine-learned models according to aspects of the present disclosure (e.g., transformer models, etc.). In some examples, the geometric reasoning model 206-1 includes a backbone portion configured to process and understand geometric features recovered and output by the scene representation model 202. In some examples, the geometric reasoning model 206-1 includes a convolutional neural network architecture. In some examples, the geometric reasoning model 206-1 includes a U-net neural network architecture. In some examples, the decoding model 206-2 includes a multilayer perceptron.

Figure 3:
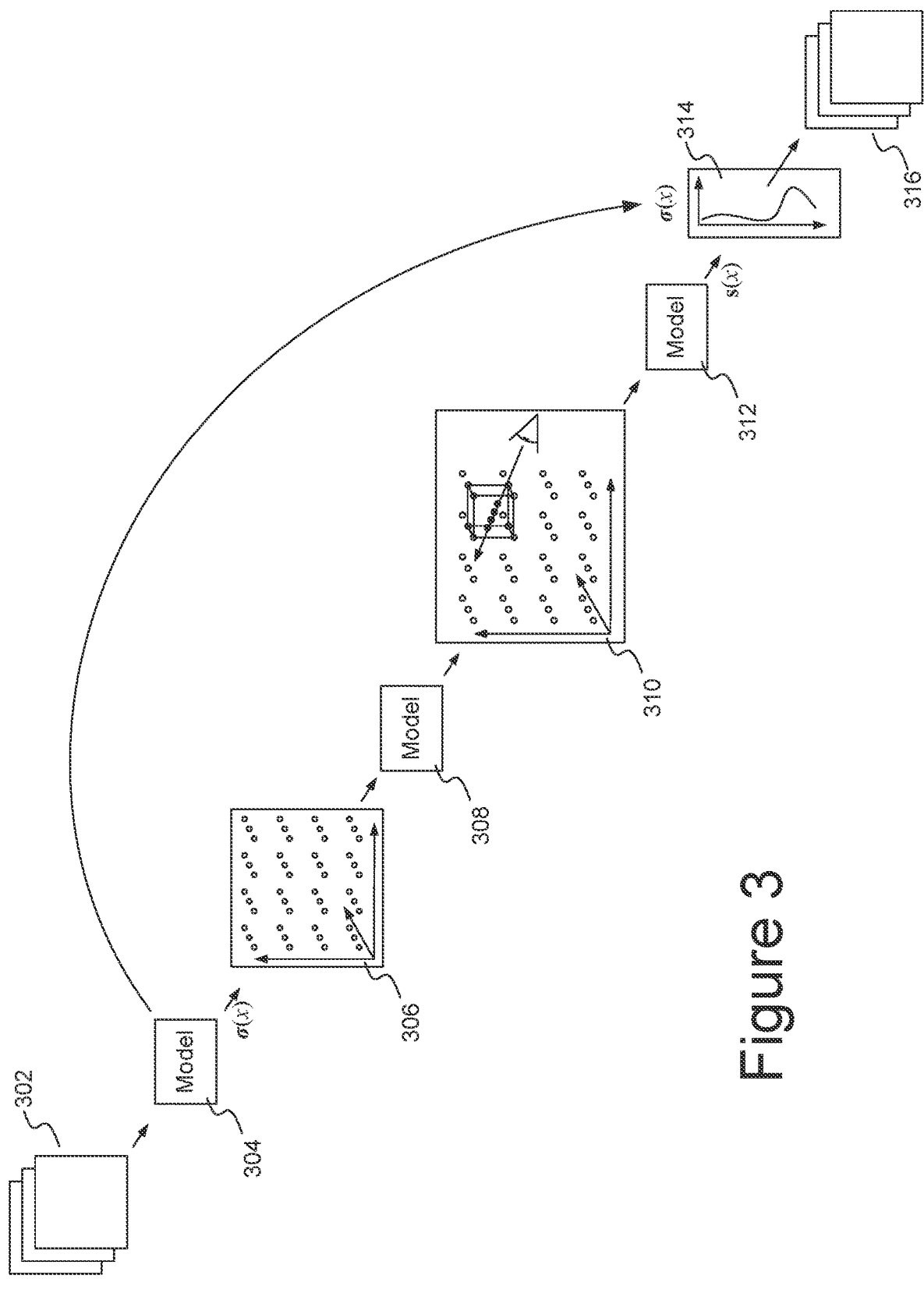
FIG. 3 depicts a diagram of an example process flow for an example semantic segmentation model framework according to example embodiments of the present disclosure.

One example processing flow is illustrated in FIG. 3. Example illustrative embodiments are described herein in the following notation. For example, a semantic segmentation model τ can be trained with learnable parameters τ to produce a semantic field $s(x|\sigma_s, \tau)$ being given across a latent geometric representation $\sigma_s$ of a scene s, where s can assign a probability distribution over semantic categories at each 3D point in space.

Input images 302 of a given scene can be provided to a representation model 304 (e.g., scene representation model 202).

The representation model 304 can learn a latent geometric representation of the given scene. For instance, the representation model 304 can include parameters that are updated such that the representation model 304 learns to encode a representation of the given scene. For instance, the representation model 304 can be trained by optimizing a loss determined by reconstructing views of the given scene (e.g., comparing the reconstructed views with the input images 302, etc.).

In some embodiments, a latent geometric representation can include a volumetric density distribution for the scene. For example, a density field can be expressed as $\sigma_s$.

In some embodiments, a geometric lattice 306 can be obtained from the latent geometric representation. For instance, a geometric lattice 306 can include a discretized representation of the density field across the volume of the scene. For instance, in some embodiments, the geometric lattice 306 can include a sampled output of the density field evaluated over a set of coordinates. For instance, the density field can be evaluated on a 3D lattice with spacing $\epsilon$, to obtain an example geometric lattice $\Sigma_s$ as expressed in Equation 4.

$$\Sigma_s = \Sigma(\sigma_s) = \{\sigma(x|\theta_s)s.t.x \in [-1:\epsilon:+1]^3\} \tag{4}$$

A geometric reasoning model 308 can be used to reason over the geometric lattice 306 to generate one or more semantic features. For instance, a feature lattice 310 can be generated using the geometric reasoning model 308. For instance, a feature lattice 310 can encode spatial information about location(s) within the lattice in view of the neighboring location(s). In this manner, for instance, the feature lattice 310 be a semantic feature field (or discretization thereof) that can be constructed to facilitate semantic association of geometric features based on relationship(s) among location(s) within the lattice.

In some embodiments, the geometric reasoning model 308 can include a machine-learned model. For instance, in some embodiments, the feature lattice 310 can be processed by a 3D machine-learned model architecture including an encoding portion or backbone (e.g., for processing a broad input scope) and a decoding portion (e.g., for recovering detail). For instance, the feature lattice 310 can be obtained from, for example, a 3D U-Net model. For instance, an example feature lattice 310, $\mathcal{F}_s$, can be obtained as expressed in Equation 5.

$$\mathcal{F}_s = \mathcal{F}(\Sigma_s|\tau_{unet}) = \text{UNet3D}(\Sigma_s|\tau_{unet}) \tag{5}$$

In Equation 5, UNet3D refers to an example model architecture described in Özgün Çiçek et al., *3D U-Net: Learning Dense Volumetric Segmentation from Sparse Annotation*, ARXIV 1606.06650 (Jun. 21, 2016).

In Equation 5, $\tau_{unet}$ refers to the learnable parameters of the Unet model (e.g., learnable parameters 208-1). In some embodiments, the same learned parameters $\tau_{unet}$ can be used for processing multiple different input scenes (e.g., multiple latent geometric representations, or lattices derived therefrom). In some embodiments, this can enable the geometric reasoning model 308 to learn features across scenes as well as facilitating generalization to novel scenes without needing pre-labeled images in input.

In some embodiments, given a query point $x \in \mathbb{R}^3$, the feature lattice 310 can be interpolated to obtain a feature vector corresponding to x. A machine-learned decoder model 312 can process the interpolated feature vector to generate a field of probability distributions over semantic categories. Equation 6 provides one example expression, in which $\tau_{mlp}$ indicates the learnable parameters of the machine-learned decoder model 312, $\mathcal{D}$ (e.g., a multilayer perceptron). For instance, $\tau_{mlp}$ can be learnable parameters 208-2.

$$s(x \mid \mathcal{F}_s, \tau_{mlp}) = \mathcal{D}(\text{TriLerp}(x, \mathcal{F}_s)\tau_{mlp}) \tag{6}$$

In some embodiments, $\tau_{mlp}$ can be shared across multiple different scenes.

In some embodiments, one or more components of the representation model 304 (e.g., the latent geometric representation, such as density field $\sigma_s$) can be used in conjunction with the semantic field to obtain a rendering of semantic segmented map(s) 316 of the scene by using volumetric rendering 314. For example, volumetric rendering of a semantic map can be obtained as expressed in Equation 7.

$$S(r \mid \sigma_s, \tau) = \int_{t_n}^{t_f} w(t \mid \sigma_s) \cdot s(x \mid \sigma_s, \tau) dt \tag{7}$$

In this manner, for instance, the three-dimensional semantic mapping of the scene can be projected to a particular viewpoint along a given ray, with the geometric information (e.g., from the density field) informing obstructions, occlusions, etc. experienced by that ray.

Advantageously, 2D rendered semantic map(s) 316 (e.g., as obtained from Equation 7) can be used for supervised training of the parameters $\tau$. For example, with reference to FIG. 2C, training classification data 240 can include a multidimensional field generated by the semantic segmentation model(s) 206 over a training scene processed from a training image set 230. From the training classification data 240, semantic maps 252 can be generated (e.g., through volumetric rendering, as described herein) for comparison with annotated semantic maps 232. Accordingly, based on the comparison, the model updater 254 can update one or more parameter(s) of the model(s).

For example, a semantic loss component can be obtained. For instance, a semantic loss component can include a cross-entropy (e.g., a softmax cross-entropy) between a rendered semantic map (e.g., output by Equation 7) and ground truth semantic maps (e.g., associated with a training example scene). In some examples, a semantic loss component can be as expressed in Equations 8 and 9.

$$\mathcal{L}_{sem}(\tau) = \mathbb{E}_s[\mathcal{L}_{sem}(\theta_s, \tau)] \tag{8}$$

$$\mathcal{L}_{sem}(\theta_s, \tau) = \sum_c \mathbb{E}_{r \sim \mathcal{R}(\gamma_c)}[CE(S(r \mid \sigma_s, \tau), S_c^{gt}(r))] \tag{9}$$

In some examples, a total loss can include an additional smoothness regularization component to encourage similar predictions in local neighborhoods. For example, Equation 10 illustrates one example regularization loss component, with sampled points $x \sim \text{Uniform}([-1,1]^3)$ and normally distributed noise $\varepsilon \sim \mathcal{N}(0,0.01)$.

$$\mathcal{L}_{reg}(\tau) = \mathbb{E}_{x,\varepsilon}[\|s(x \mid \mathcal{F}, \tau) - s(x + \varepsilon \mid \mathcal{F}, \tau)\|_2^2] \tag{10}$$

For instance, in some examples a total loss can be computed as expressed in Equation 11.

$$\mathcal{L}(\tau) = \mathcal{L}_{sem}(\tau) + \lambda \mathcal{L}_{reg}(\tau) \tag{11}$$

To increase the robustness, in some examples, data augmentation in the form of random rotations around the z-axis (i.e. upwards) can be applied. For instance, an angle $\gamma \in [0, 2\pi)$ can be sampled for each training step, and rather than extracting a geometric lattice 306 in the original coordinate system of the representation model 304, a rotation transformation $R_\gamma$ can be constructed for querying the representation model 304 at points $x' = R_\gamma(x)$, resulting in a geometric lattice as expressed in Equation 12.

$$\Sigma_s = \{\sigma(x' \mid \theta_s) s. t. x \in R_\gamma^{-1}([-1:\varepsilon:+1]^3)\} \tag{12}$$

In some embodiments, this can be obtained without retraining the models (e.g., models 202, etc.).

In some embodiments, a scene representation model 202 (e.g., a machine-learned model, such as a model leveraging neural radiance fields) can be used to encode a representation of the scene (e.g., encode using learnable parameters 204, e.g., $\theta$, such as to parameterize a density function). In some embodiments, the representation of the scene can be used by the semantic segmentation model 206 (e.g., containing one or more machine-learned models having learnable parameters 208) to evaluate a feature set over the scene representation (e.g., a representation such as $\Sigma_s$).

In some embodiments, the machine-learned semantic segmentation model framework can output classification data based on the feature set. In some embodiments, the classification data can include a field of probability distributions over semantic categories. In some embodiments, the classification data can include a probability distribution over semantic categories for a location in the scene (e.g., a specified/queried location). In some embodiments, the classification data can include a rendered semantic map of the scene as imaged (e.g., viewed) from a viewpoint (e.g., an arbitrary viewpoint, such as a specified viewpoint).

Figure 4:
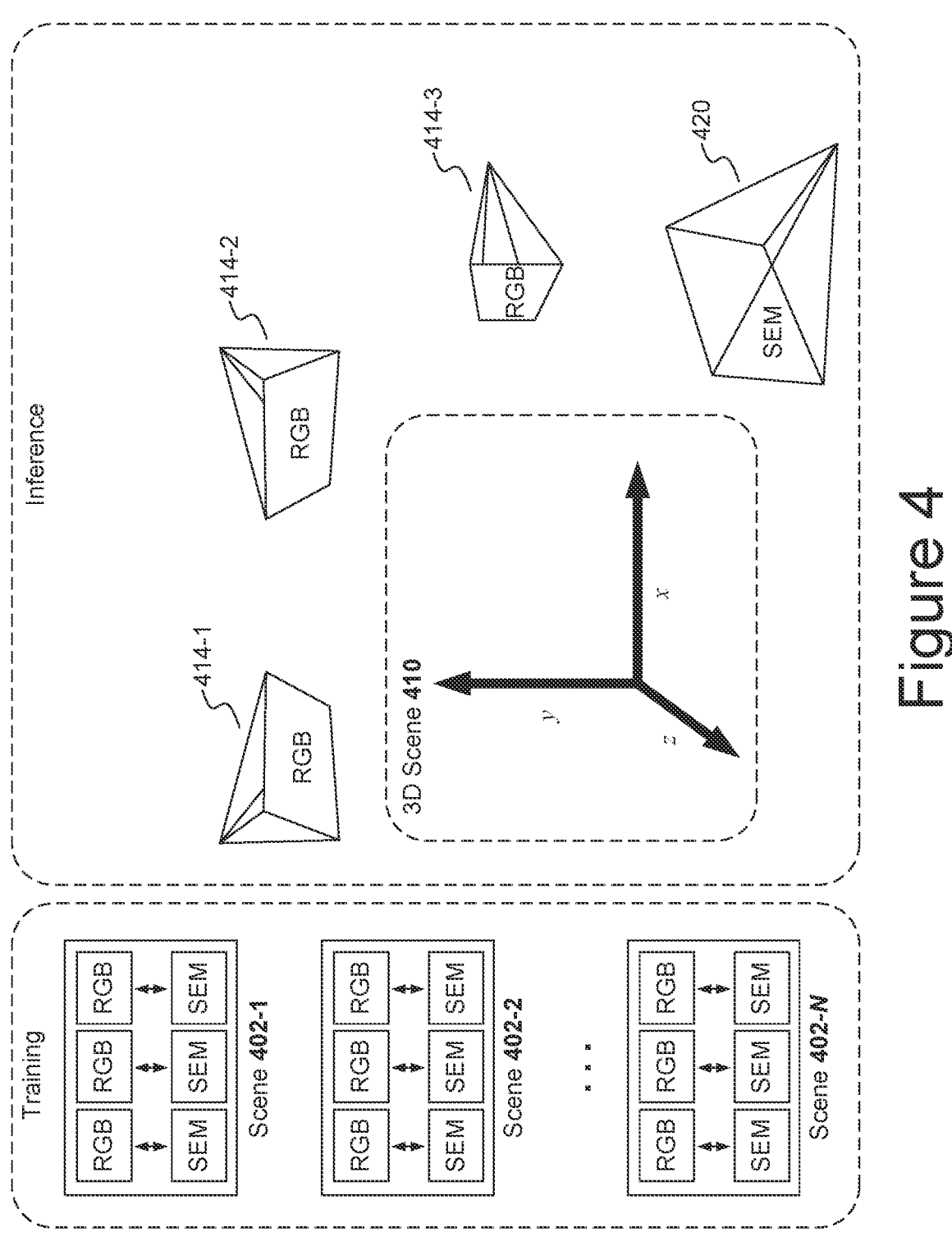
FIG. 4 depicts a block diagram of an example semantic segmentation model framework according to example embodiments of the present disclosure.
Figure 5:
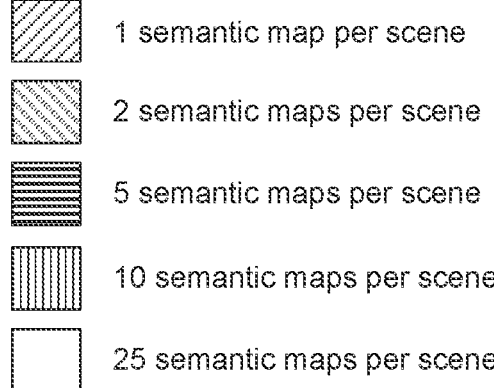
FIGS. 5 and 6 depict example training metrics of an example semantic segmentation model framework according to example embodiments of the present disclosure.
Figure 5:
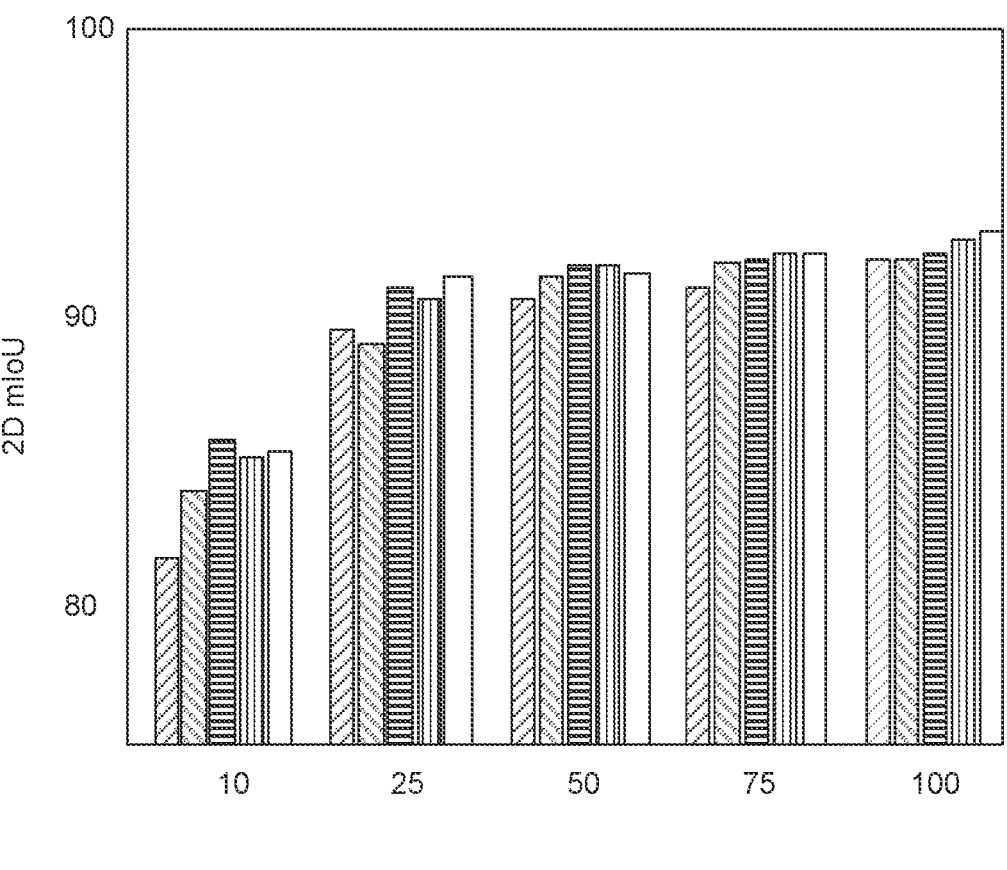
Figure 6:
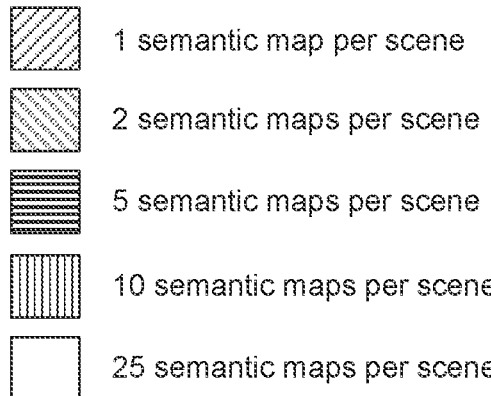
Figure 6:
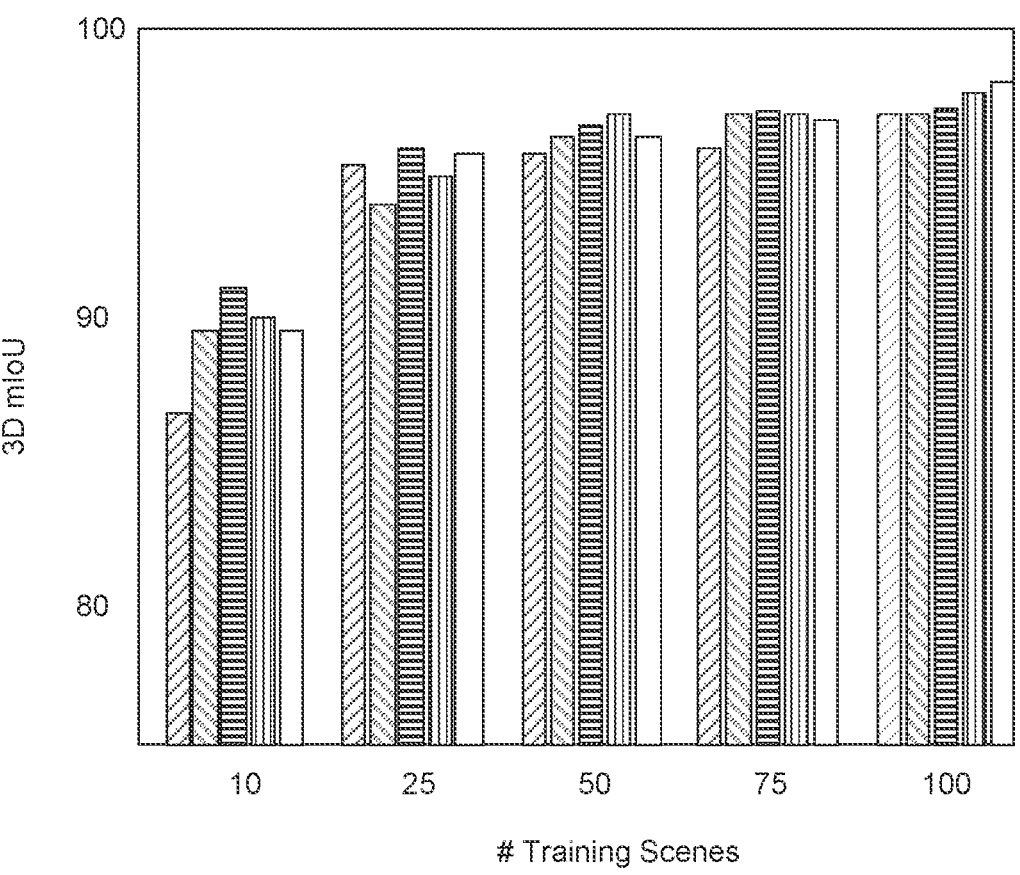

For example, FIG. 4 illustrates an example embodiment of a technique for semantic field synthesis and exploration according to the present disclosure. At Training, machine-learned semantic segmentation model framework (e.g., one or more portions of framework 200) can be trained using a set of training examples that include scenes (e.g., scenes 402-1, 402-2, 402-N, etc.) represented by images (e.g., RGB images) and at least one semantic map associated with the scene (e.g., one semantic map associated with the scene, one semantic map SEM associated with each image, etc.). For example, the training set can be used to train a semantic segmentation model (e.g., semantic segmentation model 206, geometric reasoning model 308 and decoder 312, etc.). For example, the training set can be used to train a semantic segmentation model by using the training set to learn an implicit geometric representation (e.g., with a scene representation model) and outputting the geometric representation for processing by the semantic segmentation model.

At Inference, views of a subject scene 410 can be represented in a set of one or more images (e.g., RGB images 414-1, 414-2, 414-3, etc.). The set of images can be provided to a scene representation model (e.g., scene representation model 202, 304, etc.) for training the scene representation model to generate a three-dimensional representation of the scene. For instance, the scene representation model can include a neural radiance field model, and the scene representation model can be updated to learn an implicit representation of the geometry of the scene (e.g., a density map, etc.). The pre-trained semantic segmentation model(s) can generate a three-dimensional semantic map based on the three-dimensional geometric representation.

In some embodiments, a two-dimensional semantic map 420 can be rendered from the three-dimensional semantic map (e.g., with volumetric rendering). In some embodiments, the three-dimensional semantic map can be queried directly (e.g., by coordinate, etc.) to obtain semantic information associated with one or more locations in the scene.

Example Results

For obtaining example results of example embodiments according to the present disclosure, a controlled setting where distractors such as motion blur, camera calibration error, and object motion can be eliminated is provided. Three new datasets built on Kubric are provided, with Kubric obtained from Klaus Greff, Francois Belletti, Lucas Beyer, Carl Doersch, Yilun Du, Daniel Duckworth, David J Fleet, Dan Gnanapragasam, Florian Golemo, Charles Herrmann, Thomas Kipf, Abhijit Kundu, Dmitry Lagun, Issam Laradji, Hsueh-Ti (Derek) Liu, Henning Meyer, Yishu Miao, Derek Nowrouzezahrai, Cengiz Oztireli, Etienne Pot, Noha Radwan, Daniel Rebain, Sara Sabour, Mehdi S. M. Sajjadi, Matan Sela, Vincent Sitzmann, Austin Stone, Deqing Sun, Suhani Vora, Ziyu Wang, Tianhao Wu, Kwang Moo Yi, Fangcheng Zhong, and Andrea Tagliasacchi. Kubric: a scalable dataset generator. In Proceedings of the IEEE Conference on Computer Vision and Pattern Recognition (CVPR), 2022.

The new datasets are labeled KLEVR, ToyBox5, and ToyBox13. Each dataset consists of hundreds of synthetic scenes, each containing randomly placed 3D objects which are photorealistically rendered by a path tracer supporting soft shadows, physically based materials, and global illumination effects. Each scene is described by a set of posed frames, where each frame provides an RGB image, a semantic map, and a depth map rendered from a shared camera pose. A Kubric worker script is used to generate such scenes.

KLEVR: The KLEVR dataset is akin to MNIST in machine learning. Each scene contains 4 to 12 simple geometric objects placed randomly on a matte grey floor. Each object is assigned a random hue and scale and is constrained to lie within a fixed bounding box. The semantic category of an object is set equal to its geometry class (e.g., cube, cylinder, etc.). While only the shape of each object is semantically relevant, color, scale, and placement serve as distractors. For each scene, 300 frames are rendered from randomly sampled camera poses aimed at the scene's origin. Camera poses are constrained to lie in the upper hemisphere surrounding the scene. For each frame, an RGB image, a semantic map, and a depth map are rendered.

ToyBox5 and ToyBox13: These datasets are designed to imitate scenes of children's bedrooms and are designed to be more challenging. Scenes are constructed from a large vocabulary of ShapeNet objects (from Angel X Chang, Thomas Funkhouser, Leonidas Guibas, Pat Hanrahan, Qixing Huang, Zimo Li, Silvio Savarese, Manolis Savva, Shuran Song, Hao Su, et al. Shapenet: An information-rich 3d model repository. arXiv preprint arXiv:1512.03012, 2015) coupled with HDRI backdrops (floor, horizon, and environment illumination) captured in the wild (from Greg Zaal, Rob Tuytel, Rico Cilliers, James Ray Cock, Andreas Mischok, Sergej Majboroda, Dimitrios Savva, and Junta Burger. Hdri haven. hhttps://polyhaven.com/hdris, 2021). Like KLEVR, each scene consists of 4 to 12 randomly placed objects, and frames are rendered from 300 independently sampled inward-facing camera poses. Objects are sampled at random from the 5 and 13 most common object categories, respectively for ToyBox5 and ToyBox13. Like the objects themselves, backdrops are sampled at random when constructing a scene. With thousands of objects per category to choose from, most object instances appear rarely or only once.

TABLE 1

|  | KLEVR | ToyBox5 | ToyBox13 |
| --- | --- | --- | --- |
| # scenes | 100/20 | 500/25 | 500/25 |
| # cameras/scene | 210/90 | 210/90 | 210/90 |
| # total cameras | 36,000 | 1,575.00 | 1,575,00 |
| frame resolution | 256 × 256 | 256 × 256 | 256 × 256 |
| # objects/scene | 4-12 | 4-12 | 4-12 |
| # object instances | 5 | 25,905 | 39,695 |
| # background instances | 1 | 383 | 383 |

Train/Test splits: To enable evaluation from novel views within the same scene, each scene's frames are randomly partitioned into TRAIN CAMERAS and TEST CAMERAS; the latter representing the set typically used to evaluate methods in novel view synthesis. For evaluation across scenes, scenes are partitioned into TRAIN SCENES and NOVEL SCENES.

An example embodiment of the semantic segmentation framework is tested on the three datasets. Unless otherwise stated, the models are trained on all TRAIN CAMERAS from all TRAIN SCENES. To mimic a label-scarce regime, supervision is provided from semantic maps corresponding to 9 randomly chosen cameras per scene. For 2D evaluation, 4 cameras from each NOVEL SCENES' TRAIN CAMERAS are selected. For 3D evaluation, camera parameters and ground truth depth maps are used to derive a labeled 3D point cloud from the same 4 cameras. Semantic segmentations are evaluated according to 2D and 3D mean intersection-over-union.

Training Details: In the Present Example, each scene is preprocessed by training an independent scene representation model (a neural radiance field model, in this example) for 25 k steps with Adam using an initial learning rate of 1e-3 decaying to 5.4e-4 according to a cosine rule. The NeRF architecture follows the original work. The semantic segmentation model(s) (e.g., the semantic segmentation model 206, the geometric representation model 308, decoder 312, etc.) is trained for 5 k steps using Adam with an initial learning rate of 1e-3 decaying to 4e-4. As input for the Present Example, density fields are discretized by densely probing with epsilon=1/32. resulting in 643 evenly spaced points in $[-1, +1]^3$. This density grid is then processed by the 3D UNet architecture (from Özgün Çiçek, Ahmed Abdulkadir, Soeren S Lienkamp, Thomas Brox, and Olaf Ronneberger. 3d u-net: learning dense volumetric segmentation from sparse annotation. In International conference on medical image computing and computer-assisted intervention, pp. 424-432. Springer, 2016) with 32, 64, and 128 channels at each stage of downsampling. The semantic latent vector is processed by a multilayer perceptron consisting of 2 hidden layers of 128 units.

In the Present Example, the models were trained on 32 TPUv3 cores.

Segmentation baselines (2D/3D): An example embodiment of the semantic segmentation framework is presently compared to two popular semantic segmentation baselines, DeepLab (from Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. IEEE transactions on pattern analysis and machine intelligence, 40(4):834-848, 2017) and SparseConvNet (from Benjamin Graham, Martin Engelcke, and Laurens van der Maaten. 3d semantic segmentation with submanifold sparse convolutional networks. In Proceedings of the IEEE conference on computer vision and pattern recognition, pp. 9224-9232, 2018). DeepLab follows a traditional 2D semantic segmentation pipeline, producing segmentation maps from RGB images. DeepLab v3 is trained here with Wide ResNet for 55 k steps on 16 TPUv3 chips. SparseConvNet is a point cloud segmentation method and requires explicit 3D supervision. SparseConvNet is trained here asynchronously on 20 NVIDIA V100 GPUs with momentum using a base learning rate of 1.5e-2 and decaying to 0 over the final 250 k steps of training.

The Present Example is also compared to Semantic-NeRF (from Shuaifeng Zhi, Tristan Laidlow, Stefan Leutenegger, and Andrew Davison. In-Place Scene Labelling and Understanding with Implicit Scene Representation. In ICCV, October 2021. URL https://arxiv.org/abs/2103.15875), which simultaneously optimizes a NeRF reconstruction while also fusing 2D semantic maps from the same views. While Semantic-NeRF is evaluated on 2D mIoU of unseen views, the Present Example is compared by evaluating both 2D mIoU as well as 3D mIoU of novel scenes. Semantic-NeRF's performance with the Present Example can be compared in two distinct regimes: 1) using pseudo-labeled semantic maps generated by a 2D segmentation method (here, DeepLab), and 2) using ground-truth semantic maps. While the former is easy to acquire, pseudo-labeled semantic maps may contain multi-view inconsistencies and other errors. On the other hand, it can be infeasible to obtain ground-truth labels for all test scene images in a practical application, and this regime serves as an upper bound on Semantic-NeRF's performance. Evaluation is carried out by evaluating on views for 4 unseen test cameras for each of the novel scenes. Note that results for Semantic-NeRF on the train cameras are not reported, as these views are used to train Semantic-NeRF for each of novel scenes. In comparison, the Present Example's semantic module does not require semantic supervision at test time.

directly comparable, the Present Example is compared to competitive baselines for 2D image segmentation and 3D point cloud segmentation.

Comparison to DeepLab (2D): To maintain a fair comparison in 2D, both the semantic phase of the Present Example and DeepLab are trained on an identical set of paired RGB images and semantic maps for a fixed set of scenes (i.e. 9 per scene in TRAIN SCENES). The Present Example has further access to all 210 RGB maps associated with each scene's TRAIN CAMERAS, which are used to fit per-scene NeRF models. Both methods are evaluated on a random sampling of frames from NOVEL SCENES, 4 per scene. To emphasize the 3D nature of the Present Example, additional camera poses from NOVEL SCENES where RGB information is not available are used, an additional 4 per scene from each scene's TEST CAMERAS.

Comparison to SparseConvNet (3D): As SparseConvNet requires 3D input, an oracle point cloud is derived for each scene from camera poses and ground truth depth maps—hence giving an unfair advantage to this method, establishing an upper bound on performance given full 3D supervision. For this, the same 210 train frames used to fit NeRF models in the 2D comparison are used. A subset of each point cloud is selected for 3D semantic supervision; namely, the points corresponding to the 9 semantic maps supervising Present Example and DeepLab. The Present Example and SparseConvNet are evaluated on two sets of 3D points on NOVEL SCENES. The first set is a subset of each point cloud corresponding to 4 randomly chosen frames from each scene's TRAIN CAMERAS. These points are available to SparseConvNet as part of each scene's 3D representation. The second set is a set of additional query points derived from 4 additional frames from each scene's TEST CAMERAS. As SparseConvNet is not designed to classify points beyond its input point cloud, a nearest neighbor label propagation procedure is used to assign labels to the latter.

For quantitative comparisons, see Table 2 and Table 3. The Present Example performs comparably to the benchmarks. Further, it is able to achieve near identical accuracy on novel camera poses, a task DeepLab is unable to approach. And the Present Example does not require full 3D supervision, like SparseConvNet.

Sensitivity to data scarcity: To investigate Present Example's applicability to scenarios where labeled semantic maps are scarce, the number of semantic maps per scene is

TABLE 2

| | TRAIN CAMERAS | | TEST CAMERAS | |
|---|---|---|---|---|
| | 2D mIoU | 3D mIoU | 2D mIoU | 3D mIoU |
| NeSF | 92.7 | 97.8 | 92.6 | 97.5 |
| DeepLab [16] | 97.1 | N/A | N/A | N/A |
| SparseConvNet [44] | N/A | 99.7 | N/A | 99.7 |

TABLE 3

| | ToyBox5 | | | | ToyBox13 | | | |
|---|---|---|---|---|---|---|---|---|
| | TRAIN CAMERAS | | TEST CAMERAS | | TRAIN CAMERAS | | TEXT CAMERAS | |
| | 2D mIoU | 3D mIoU | 2D mIoU | 3D mIoU | 2D mIoU | 3D mIoU | 2D mIoU | 3D mIoU |
| NeSF | $81.9 \pm 0.8$ | $88.7 \pm 0.9$ | $81.7 \pm 0.6$ | $89.6 \pm 9.7$ | $56.5 \pm 0.8$ | $60.1 \pm 0.6$ | $56.6 \pm 1.0$ | $61.9 \pm 0.9$ |
| DeepLab [16] | 81.5 | N/A | N/A | N/A | 63.1 | N/A | N/A | N/A |
| SparseConvNet [44] | N/A | 56.4 | N/A | 94.8 | N/A | 83.2 | N/A | 81.7 |

Comparisons to baselines: A first set of experiments evaluates the performance of the Present Example in comparison to alternative benchmark methods on the KLEVR, ToyBox5, and ToyBox13 datasets. It is believed that the Present Example is the first method capable of simultaneously producing 3D geometry, 2D semantic maps, and 3D semantic labels directly from posed RGB images at inference time—the Present Example is capable of being trained on posed 2D supervision alone. As no existing method is modulated. The Present Example generalizes to novel scenes with as few as one semantic map per train scene. See FIGS. 5 and 6 for mean intersection-over-union (mIoU) results for 2D and 3D.

Robustness to dataset shift: a set of experiments highlighting the differences between the Present Example and Semantic-NeRF in semantic prediction of novel scenes. The Present Example can learn semantics from 3D geometry allowing the method to be robust to visual, texture-based changes commonly observed amongst everyday objects.

The following dataset perturbations are used:

Mono-Color: train scenes contain monochrome-colored objects, whereas novel scenes contain randomly sampled colors for each object.

Fixed-Color: Each object with the same semantic category has the same RGB color assigned to it within train scenes. Within novel scenes, each object is assigned a random color.

Color-Color: Each object within the same semantic category is randomly assigned a color from a fixed set of colors at train scenes. At novel scenes, a different set of colors is used for each semantic category.

Texture-Texture: Each object within the same category is randomly assigned a texture from a fixed set of textures at train scenes. Within novel scenes, a new texture is used for each semantic category.

The Present Example is robust to several types of visual dataset shift. See Table 4.

TABLE 4

|  |  | Fixed-Color | Mono-Color | Color-Color | Texture |
|---|---|---|---|---|---|
| NeSF | 2D | 93.7 ± 2.0 | 92.3 ± 0.0 | 93.4 ± 2.0 | 92.5 ± 3.0 |
|  | 3D | 86.0 ± 3.0 | 85.6 ± 2.0 | 88.3 ± 3.0 | 90.5 ± 5.4 |
| Semantic- | 2D | 22.7 ± 0.0 | 37.7 ± 0.01 | 89.6 ± 0.0 | 40.5 ± 0.0 |
| NeRF | 3D | 22.0 ± 0.0 | 35.2 ± 0.0 | 85.6 ± 0.1 | 41.7 ± 0.0 |
| (DeepLab) |  |  |  |  |  |
| Semantic- | 2D | 95.0 ± 0.0 | 95.0 ± 0.0 | 94.6 ± 0.0 | 95.1 ± 0.0 |
| NeRF |  |  |  |  |  |
| (Ground | 3D | 93.7 ± 0.0 | 92.5 ± 0.0 | 94.8 ± 0.0 | 94.4 ± 0.0 |
| Truth) |  |  |  |  |  |

Example Methods

FIG. 7 depicts a flowchart of a method 700 for performing according to aspects of the present disclosure. One or more portion(s) of the method 700 can be implemented by a computing system that includes one or more computing devices such as, for example, the computing systems described with reference to the other figures. Each respective portion of the method 700 can be performed by any (or any combination) of one or more computing devices. Moreover, one or more portion(s) of the method 700 can be implemented as an algorithm on the hardware components of the device(s) described herein, for example, to perform semantic segmentation, for training models to perform semantic segmentation, etc. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 may be described with reference to elements/terms described with respect to other systems and figures for exemplary illustrated purposes and is not meant to be limiting. One or more portions of method 700 can be performed additionally, or alternatively, by other systems.

At 702, example method 700 includes obtaining an image set including one or more views of a subject scene. For instance, the image set can include one or more single-channel or multi-channel images (e.g., monochrome, RGB, etc.) from one or more viewpoints of a scene. In some embodiments, the image set can be part of a training set or part of an inference set. For instance, a training set can include one or more segmented maps associated with the image set (e.g., one or more segmented images corresponding to the viewpoint of at least one of the images in the image set). An inference set can, in some embodiments, lack any segmented maps (e.g., containing unsegmented images).

At 704, example method 700 includes generating, based at least in part on the image set, a scene representation describing the subject scene in three dimensions. For instance, the scene representation can include an explicit or implicit geometric representation. In some embodiments, the scene representation can include a three-dimensional density field. The density field can be sampled to generate a discretized density lattice. For instance, an input lattice can be provided, containing coordinates at which to sample the density field (e.g., sample the output of the machine-learned scene representation model). For instance, the scene representation can be generated by training a machine-learned model to reconstruct the image set by projecting the geometric representation into the perspectives of the image set and comparing the projections with the image set. For example, the scene representation can be generated using a neural radiance field model.

At 706, example method 700 includes generating, using a machine-learned semantic segmentation model framework, a multidimensional field of probability distributions over semantic categories, the multidimensional field defined over the three dimensions of the subject scene. For example, in some embodiments, a machine-learned model of the semantic segmentation model framework can process the density field (or a discretization thereof) to generate a semantic feature field (e.g., a feature lattice 310). In some embodiments, the semantic feature field (or discretization thereof) can be decoded by a subsequent machine-learned model (e.g., model 312) to output the multidimensional field of probability distributions. In some embodiments, the semantic feature field (or discretization thereof) can be decoded by a subsequent machine-learned model (e.g., model 312) to output a direct query result for a given set of coordinates of interest. In some embodiments, the semantic feature field (or discretization thereof) can be interpolated to obtain a probability distribution associated with at least one location in the scene.

At 708, example method 700 includes outputting classification data for at least one location in the subject scene. For instance, classification data can include a one-hot vector of classification data for a given query (e.g., one or more coordinates of interest). Classification data can include a softmax output layer that outputs a probability distribution over a set of classifications for a given query (e.g., one or more coordinates of interest). Classification data can be graphical: for instance classification data can include a graphical mapping of semantic associations among location(s) in the three-dimensional scene. For instance, graphical classification data can be provided by painting a given color value over a two-dimensional area or three-dimensional volume associated with the scene or a view thereof.

In some embodiments, example method 700 includes outputting, using a volumetric rendering, a two-dimensional semantic map of the subject scene. In some embodiments, the two-dimensional semantic map can be used to train the semantic segmentation model framework (e.g., by comparison to one or more segmentation maps associated with the input image set).

In some embodiments, example method 700 includes obtaining a second image set comprising one or more views of a second subject scene. In some embodiments, example method 700 includes generating, based at least in part on the second image set, a second scene representation describing the second subject scene in three dimensions. In some embodiments, example method 700 includes generating, using the machine-learned semantic segmentation model framework, a second multidimensional field of probability distributions over semantic categories, the second multidimensional field defined over the three dimensions of the second subject scene.

In some embodiments, in example method 700, the machine-learned semantic segmentation model framework includes a first machine-learned model configured to generate the scene representation according to a set of scene-specific weights.

In some embodiments, in example method 700, the set of scene-specific weights were learned by optimizing a reconstruction loss over the image set. In some embodiments, in example method 700, the reconstruction loss can be determined using the image set and a corresponding set of two-dimensional renderings of the scene representation.

In some embodiments, in example method 700, the machine-learned semantic segmentation model framework includes one or more second machine-learned models configured to generate the multidimensional field according to a set of segmentation weights learned using a plurality of training example scenes.

In some embodiments, in example method 700, the one or more second machine-learned models were trained without three-dimensional supervision.

In some embodiments, in example method 700, the one or more second machine-learned models were trained using a segmentation loss determined using a reference two-dimensional segmentation map and a generated two-dimensional segmentation map. In some embodiments, in example method 700, the generated two-dimensional segmentation map can be obtained by a volumetric rendering of a semantic feature field generated by the machine-learned semantic segmentation model framework.

FIG. 8 depicts a flowchart of a method 800 for performing according to aspects of the present disclosure. One or more portion(s) of the method 800 can be implemented by a computing system that includes one or more computing devices such as, for example, the computing systems described with reference to the other figures. Each respective portion of the method 800 can be performed by any (or any combination) of one or more computing devices. Moreover, one or more portion(s) of the method 800 can be implemented as an algorithm on the hardware components of the device(s) described herein, for example, to perform semantic segmentation, for training models to perform semantic segmentation, etc. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 may be described with reference to elements/terms described with respect to other systems and figures for exemplary illustrated purposes and is not meant to be limiting. One or more portions of method 800 can be performed additionally, or alternatively, by other systems.

At 802, example method 800 includes obtaining a reference map set including one or more two-dimensional reference semantic maps respectively associated with one or more views of a reference scene.

At 804, example method 800 includes generating, using a machine-learned semantic segmentation model framework, a multidimensional field of probability distributions over semantic categories (the multidimensional field defined over three dimensions of the reference scene).

At 806, example method 800 includes updating a set of segmentation parameters of the machine-learned semantic segmentation model framework based at least in part on comparing the reference map set and a rendered map set including one or more rendered semantic maps obtained from the multidimensional field respectively for the one or more views (the rendered map set obtained using the set of segmentation parameters).

In some embodiments, in example method 800, the machine-learned semantic segmentation model framework comprises a first machine-learned model configured to generate the multidimensional field based at least in part on a scene representation describing the reference scene in three dimensions.

In some embodiments, in example method 800, the machine-learned semantic segmentation model framework includes a second machine-learned model configured to generate the scene representation based at least in part on the one or more views.

In some embodiments, in example method 800, the second machine-learned model is trained independently from the first machine-learned model.

In some embodiments, in example method 800, the second machine-learned model includes a scene-specific weight set trained over the one or more views.

In some embodiments, example method 800 includes training the first machine-learned model over a plurality of training scenes. In some embodiments, example method 800 includes training the second machine-learned model over an inference scene not included in the plurality of training scenes. In some embodiments, example method 800 includes generating, using the first machine-learned model, a semantic feature field defined over three dimensions of the inference scene.

In some embodiments, example method 800 includes generating, using the first machine-learned model, an inference-time multidimensional field of probability distributions over semantic categories, the inference-time multidimensional field defined over three dimensions of the inference scene.

Embodiments of example methods 700 and 800 can be implemented by a system for three-dimensional semantic segmentation of a scene. The system can include one or more processors and one or more non-transitory computer-readable storage media storing instructions that are executable to cause the one or more processors to perform embodiments of example methods 700 and 800.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for constructing a three-dimensional semantic segmentation of a scene from two-dimensional inputs, comprising:

generating, by a computing system comprising one or more processors and based on evaluating a first machine-learned model over a multidimensional lattice, a scene representation describing a subject scene in three dimensions;

generating, by the computing system and using one or more second machine-learned models of a machine-learned semantic segmentation-model framework to process the scene representation, a multidimensional field of probability distributions over semantic categories, the multidimensional field defined over the three dimensions of the subject scene, the one or more second machine-learned models comprising segmentation weights learned based on a plurality of training example scenes; and outputting, by the computing system and based on the multidimensional field, classification data corresponding to one or more of the semantic categories for at least one location in the subject scene.

2. The computer-implemented method of claim 1, wherein the first machine-learned model comprises scene-specific weights learned based on an image set comprising one or more views of the subject scene.

3. The computer-implemented method of claim 1, wherein the first machine-learned model comprises a machine-learned density model, and wherein the scene representation provides a discretized representation of a density field across the subject scene.

4. The computer-implemented method of claim 1, comprising:

processing, by the computing system and using a geometric reasoning model of the one or more second machine-learned models, the scene representation to generate a feature lattice;

interpolating, by the computing system, the feature lattice to obtain feature data corresponding to one or more locations in the subject scene; and decoding, by the computing system and using a machine-learned decoder model of the one or more second machine-learned models, the feature data to obtain one or more values of the multidimensional field at the one or more locations in the subject scene.

5. The computer-implemented method of claim 1, comprising:

outputting, by the computing system and using a volumetric rendering, a two-dimensional semantic map of the subject scene.

6. The computer-implemented method of claim 4, comprising:

performing, by the computing system, volumetric rendering over the multidimensional field along a ray from a viewpoint to the at least one location, the ray comprising the one or more locations.

7. The computer-implemented method of claim 1, comprising:

generating, by the computing system and based on evaluating a third machine-learned model over a second multidimensional lattice, a second scene representation describing a second subject scene in three dimensions, the third machine-learned model comprising scene-specific weights learned based on a second image set comprising one or more views of the second subject scene;

generating, by the computing system and using the one or more second machine-learned models of the machine-learned semantic segmentation model framework to process the second scene representation, a second multidimensional field of probability distributions over semantic categories, the second multidimensional field defined over the three dimensions of the subject scene; and outputting, by the computing system and based on the second multidimensional field, second classification data corresponding to one or more of the semantic categories for at least one second location in the second subject scene.

8. The computer-implemented method of claim 1, wherein the one or more second machine-learned models were trained without three-dimensional supervision.

9. The computer-implemented method of claim 1, wherein the one or more second machine-learned models were trained using a segmentation loss determined using a reference two-dimensional segmentation map and a generated two-dimensional segmentation map, the generated two-dimensional segmentation map obtained by a volumetric rendering of a semantic feature field generated by the machine-learned semantic segmentation model framework.

10. A computer-implemented method for training a machine-learned semantic segmentation model framework for three-dimensional semantic segmentation of novel scenes, comprising:

training a set of segmentation parameters of the machine-learned semantic segmentation model framework over a plurality of training example scenes, the training comprising:

obtaining, by a computing system comprising one or more processors, a reference map set comprising one or more two-dimensional reference semantic maps respectively associated with one or more views of a reference scene of the plurality of training example scenes;

generating, by the computing system and the machine-learned semantic segmentation model framework, a multidimensional field of probability distributions over semantic categories, the multidimensional field defined over three dimensions of the reference scene; and updating, by the computing system, the set of segmentation parameters of the machine-learned semantic segmentation model framework based at least in part on comparing:

the reference map set; and a rendered map set comprising one or more rendered semantic maps obtained from the multidimensional field respectively for the one or more views, the rendered map set obtained using the set of segmentation parameters.

11. The computer-implemented method of claim 10, wherein the machine-learned semantic segmentation model framework comprises a first machine-learned model configured to generate the multidimensional field based at least in part on a scene representation describing the reference scene in three dimensions.

12. The computer-implemented method of claim 11, wherein the machine-learned semantic segmentation model framework comprises a second machine-learned model configured to generate the scene representation, the second machine-learned model comprising scene-specific weights learned based on an image set comprising one or more unsegmented views of the reference scene.

13. The computer-implemented method of claim 12, wherein the second machine-learned model is trained independently from the first machine-learned model.

14. The computer-implemented method of claim 10, comprising:

generating, by the computing system, a rendered semantic map based on:

generating, by the computing system, based on evaluating a first machine-learned model over a multidimensional lattice, a scene representation describing the reference scene in three dimensions;

generating, by the computing system and using one or more second machine-learned models of the machine-learned semantic segmentation model framework to process the scene representation, the multidimensional field; and performing, by the computing system, volumetric rendering over the multidimensional field along a ray from a viewpoint to a location in the reference scene.

15. The computer-implemented method of claim 12, comprising:

processing, by the computing system and using a geometric reasoning model of the machine-learned semantic segmentation model framework, the scene representation to generate a feature lattice;

interpolating, by the computing system, the feature lattice to obtain feature data corresponding to one or more locations in the reference scene; and decoding, by the computing system and using a machine-learned decoder model of machine-learned semantic segmentation model framework, the feature data to obtain one or more values of the multidimensional field at the one or more locations in the reference scene.

16. A computing system for three-dimensional semantic segmentation of a scene, comprising:

one or more processors; and one or more non-transitory computer-readable storage media storing instructions that are executable to cause the one or more processors to perform operations, the operations comprising:

generating, based on evaluating a first machine-learned model over a multidimensional lattice, a scene representation describing a subject scene in three dimensions;

generating, using one or more second machine-learned models of a machine-learned semantic segmentation-model framework to process the scene representation, a multidimensional field of probability distributions over semantic categories, the multidimensional field defined over the three dimensions of the subject scene, the one or more second machine-learned models comprising segmentation weights learned based on a plurality of training example scenes; and outputting, based on the multidimensional field, classification data corresponding to one or more of the semantic categories for at least one location in the subject scene.

17. The computing system of claim 16, wherein the first machine-learned model comprises scene-specific weights learned based on an image set comprising one or more views of the subject scene.

18. The computing system of claim 16, the operations comprising:

processing, using a geometric reasoning model of the one or more second machine-learned models, the scene representation to generate a feature lattice;

interpolating the feature lattice to obtain feature data corresponding to one or more locations in the subject scene; and decoding, using a machine-learned decoder model of the one or more second machine-learned models, the feature data to obtain one or more values of the multidimensional field at the one or more locations in the subject scene.

19. The computing system of claim 18, the operations comprising:

performing volumetric rendering over the multidimensional field along a ray from a viewpoint to the at least one location, the ray comprising the one or more locations.

20. The computing system of claim 16, wherein the operations comprise:

obtaining a two-dimensional reference semantic map associated with the at least one location in the subject scene;

updating a set of segmentation parameters of the machine-learned semantic segmentation model framework based at least in part on comparing:

the classification data; and the two-dimensional reference semantic map.

* * * * *